US008062131B2

(12) United States Patent
Hoga et al.

(10) Patent No.: US 8,062,131 B2
(45) Date of Patent: Nov. 22, 2011

(54) GAME SYSTEM AND GAME APPARATUS USED FOR THE SAME

(75) Inventors: Toru Hoga, Fukuoka (JP); Takao Nakano, Kyoto (JP); Satoshi Kira, Kyoto (JP); Kouzou Tahara, Kyoto (JP)

(73) Assignees: Nintendo Co., Ltd., Kyoto (JP); Ganbarion Co., Ltd., Fukuoka (JP)

( * ) Notice: Subject to any disclaimer, the term of this patent is extended or adjusted under 35 U.S.C. 154(b) by 1552 days.

(21) Appl. No.: 11/473,058

(22) Filed: Jun. 23, 2006

(65) Prior Publication Data

US 2007/0063986 A1    Mar. 22, 2007

(30) Foreign Application Priority Data

Jul. 20, 2005  (JP) ................................ 2005-210479

(51) Int. Cl.
*A63F 13/00* (2006.01)
(52) U.S. Cl. ........................................... 463/37; 434/85
(58) Field of Classification Search .................... 463/37; 434/85
See application file for complete search history.

(56) References Cited

U.S. PATENT DOCUMENTS

| | | | | |
|---|---|---|---|---|
| 6,052,117 A * | 4/2000 | Ohara et al. | ................. | 345/173 |
| 6,572,378 B1 * | 6/2003 | Rehkemper et al. | ............ | 434/85 |
| 6,722,891 B1 * | 4/2004 | Ma | ................................ | 434/409 |
| 6,729,881 B2 * | 5/2004 | Marcus et al. | ................. | 434/156 |
| 2001/0038999 A1 * | 11/2001 | Hainey, II | ........................ | 434/85 |
| 2003/0104343 A1 * | 6/2003 | Rehkemper et al. | ............ | 434/85 |
| 2003/0162151 A1 * | 8/2003 | Berling et al. | ..................... | 434/5 |
| 2004/0002038 A1 * | 1/2004 | Leather et al. | ................... | 434/97 |
| 2004/0075676 A1 * | 4/2004 | Rosenberg et al. | ........... | 345/701 |
| 2004/0209232 A1 * | 10/2004 | Neumann et al. | ............. | 434/236 |
| 2004/0219495 A1 * | 11/2004 | Marcus et al. | ................. | 434/156 |
| 2004/0224775 A1 * | 11/2004 | Wood et al. | ..................... | 463/43 |
| 2005/0017947 A1 * | 1/2005 | Shahoian et al. | ............. | 345/156 |
| 2005/0106538 A1 * | 5/2005 | Freeman et al. | ............. | 434/167 |
| 2005/0229421 A1 * | 10/2005 | Deas et al. | ....................... | 33/563 |
| 2006/0123362 A1 * | 6/2006 | Keely | .............................. | 715/857 |
| 2006/0166173 A1 * | 7/2006 | Ellis et al. | ..................... | 434/185 |

FOREIGN PATENT DOCUMENTS

| | | |
|---|---|---|
| JP | 5-128315 | 5/1993 |
| JP | 9-91085 | 4/1997 |
| JP | 3082200 | 6/2000 |

* cited by examiner

*Primary Examiner* — Masud Ahmed
(74) *Attorney, Agent, or Firm* — Nixon & Vanderhye P.C.

(57) ABSTRACT

In the state where a card having a hole or a cut-out portion of a predetermined shape is placed on a touch panel of a game apparatus, a player performs an input operation along the hole or the cut-out portion. Then, the input operation is detected. It is determined whether or not the input operation on the touch panel has been performed using the card, based on the detected input track and determination information for determining whether or not the input operation has been performed along the hole or cut-out portion of the card which is placed on the touch panel. In accordance with the determination result, an event is generated. Thus, a novel input system, as a combination of a touch panel and a card, for generating an event which influences the progress of the game is realized.

13 Claims, 24 Drawing Sheets

FIG.6

| APERTURE | APEX COORDINATE SET DATA | EVENT |
|---|---|---|
| COMPARISON TRACK INFORMATION 53 | | |
| APERTURE A | APEX P0(9, 15)<br>APEX P1(24, 18)<br>⋮<br>APEX P20(27, 43) | ACQUIRE ITEM X |
| APERTURE B | APEX P0(69, 20)<br>APEX P1(44, 31)<br>⋮<br>APEX P20(33, 40) | CAUSE CHARACTER Y TO APPEAR |
| ⋮ | ⋮ | ⋮ |

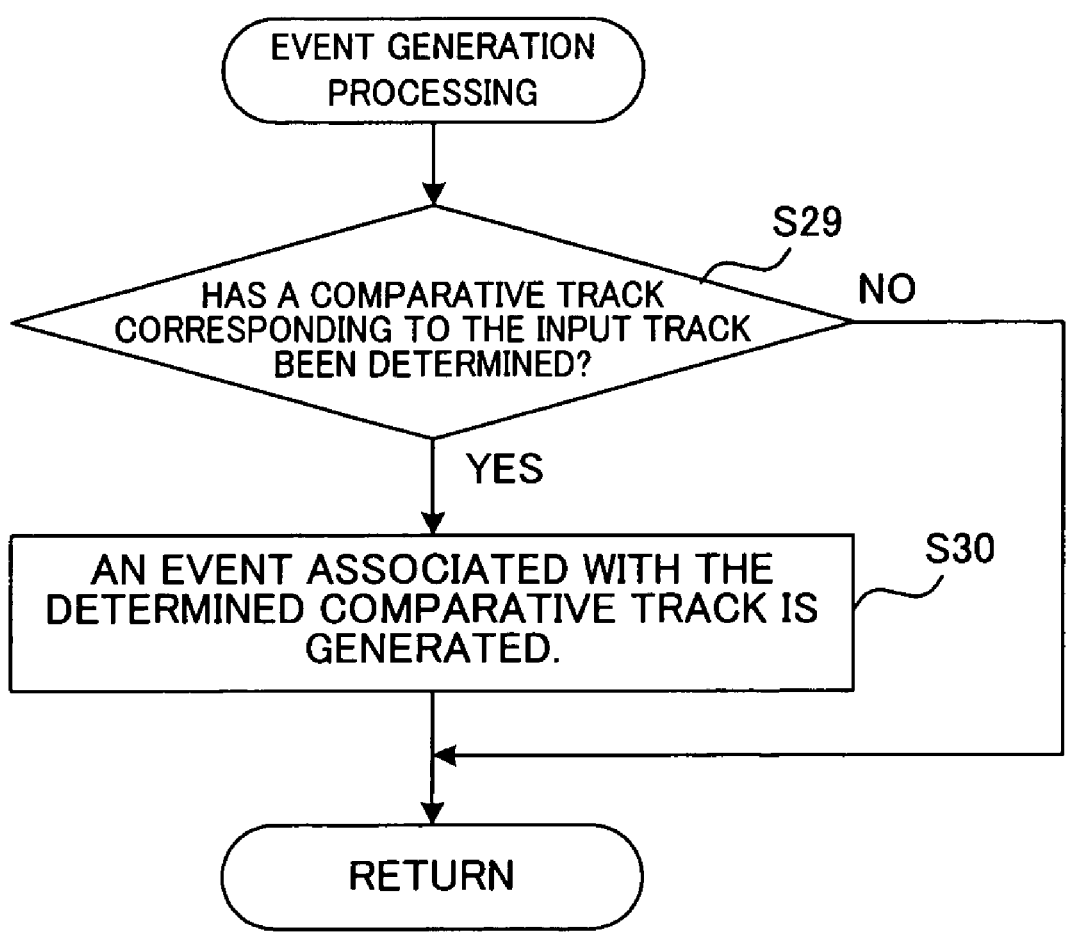

| DETERMINATION INFORMATION 54 | | |
|---|---|---|
| APERTURE | PASSING ORDER OF RECOGNITION AREAS | EVENT |
| APERTURE C | 10→18→25→28→20→12→5→6→15→23→30→38 | ACQUIRE ITEM B |
| APERTURE D | ... | WARP TO THE NEXT STAGE |
| ⋮ | ⋮ | ⋮ |

FIG.19

| DETERMINATION INFORMATION 54 | | |
|---|---|---|
| APERTURE | TRACK DATA CONVERSION VALUE d | EVENT |
| APERTURE C | 1639 | ACQUIRE ITEM B |
| APERTURE D | 2597 | WARP TO THE NEXT STAGE |
| ⋮ | ⋮ | ⋮ |

FIG.20

| DETERMINATION INFORMATION 54 | | |
|---|---|---|
| APERTURE | TRACK DATA CONVERSION VALUE v | EVENT |
| APERTURE C | 1639 | ACQUIRE ITEM B |
| APERTURE D | 2597 | WARP TO THE NEXT STAGE |
| APERTURE C → APERTURE D | 6833 | ACQUIRE ITEM C |
| APERTURE D → APERTURE C | 5875 | ACQUIRE ITEM D |
| ⋮ | ⋮ | ⋮ |

GAME SYSTEM AND GAME APPARATUS USED FOR THE SAME

CROSS REFERENCE TO RELATED APPLICATION

The disclosure of Japanese Patent Application No. 2005-210479 is incorporated herein by reference.

BACKGROUND

1. Field of the Technology

The technology presented herein relates to a game system, and in particular to a game system including a game apparatus having a touch panel and a card detachably mountable on the touch panel.

2. Description of the Background Art

Patent document 1 (Japanese Patent No. 3082200) discloses an image creation apparatus. A user places a flexible sheet having a predetermined graphic pattern printed on one or two surfaces thereof (play card) on an image drawing area of a tablet, and traces the graphic pattern printed on the card. Thus, the graphic pattern is displayed on a screen of a monitor.

Patent document 2 (Japanese Laid-Open Patent Publication No. 9-91085) discloses a transmission-type image drawing apparatus. While watching a target object through the tablet and an LCD panel, a user traces the target object on a tablet with a pen. Thus, the target object is displayed on the LCD panel.

Patent document 3 (Japanese Laid-Open Patent Publication No. 5-128315) discloses a character recognition apparatus for recognizing a handwritten character which is input through a tablet and displaying a character corresponding to the recognition result on an LCD based on character data stored on a memory card.

None of the above-mentioned patent documents discloses a technology for generating an event which influences the progress of a game in accordance with a track made on a touch panel by a user as a result of the player tracing an aperture formed in a card. With the image creation apparatus disclosed in patent document 1, when the user traces the graphic pattern printed on the play card, the track of the tracing is merely displayed on the screen. With the transmission-type image drawing apparatus disclosed in patent document 2, when the user traces the target object seen through the tablet, the track of the tracing is merely displayed on the screen. The character recognition apparatus disclosed in patent document 3 is not for merely displaying a handwritten character which is input through the tablet (i.e., an input track), but still this apparatus is basically for merely displaying the character intended by the user on the screen.

SUMMARY

Therefore, a feature of an example embodiment presented herein is to provide a novel input system, as a combination of a touch panel and a card having an aperture, for generating an event which influences the progress of a game.

The present example embodiment has the following features to attain the above. The reference numerals in parentheses in this section of the specification indicate the correspondence with the embodiments described later for easier understanding of the present example embodiment, and do not limit the present example embodiment in any way.

A first aspect of the present example embodiment is directed to a game system including a game apparatus (10) having a touch panel (15), and a card (40) detachably mountable at a predetermined position of the touch panel. The card has at least one aperture formed of a hole (41) or a cut-out portion (42, 44, 45) having a predetermined shape. The game apparatus comprises determination information storage means (21, 53, 53), input track detection means (21, S16), input operation determination means (21, S11), and event generation means (21, S12). The determination information storage means is for storing determination information for determining whether or not an input operation on the touch panel has been performed along the aperture of the card in the state where the card is placed at the predetermined position of the touch panel. The input track detection means is for detecting an input track based on a signal from the touch panel. The input operation determination means is for determining whether or not the input operation on the touch panel has been performed along the aperture of the card based on the input track detected by the input track detection means and the determination information stored by the determination information storage means. The event generation means is for generating an event which changes the progress of a game when the input operation determination means determines that the input operation on the touch panel has been performed along the aperture.

In a second aspect, the determination information storage means stores, as the determination information, a comparative track corresponding to an input track obtained when an input operation is performed along the aperture of the card in the state where the card is placed on the touch panel. The input operation determination means calculates a similarity degree between the input track detected by the input track detection means and the comparative track stored by the determination information storage means, and determines whether or not the input operation on the touch panel has been performed along the aperture of the card based on the similarity degree.

In a third aspect, the determination information storage means stores, as the determination information, a plurality of pieces of coordinate set data forming the comparative track to be checked against the input track. The input operation determination means calculates at least one of (i) a difference between an angle of each of line segments of the input track and an angle of each of corresponding line segments of the comparative track, and (ii) a difference between a position of each of apexes of the input track and a position of each of corresponding apexes of the comparative track, based on the plurality of pieces of coordinate data stored by the determination information storage means and coordinate data detected by the input track detection means, and calculates the similarity degree based on the calculation result.

In a fourth aspect, the game apparatus further comprises recognition area information storage means for storing a plurality of recognition areas virtually set on an operation plane of the touch panel and recognition area information which associates unique recognition information to each of the plurality of recognition areas. The input track detection means sequentially detects input coordinate sets based on a signal from the touch panel and sequentially determines which recognition area includes each input coordinate set referring to the recognition area information. The input operation determination means determines whether or not the input operation on the touch panel has been performed along the aperture based on an identification number of each of the recognition areas determined by the input track detection means.

In a fifth aspect, the input operation determination means performs a predetermined calculation using the identification number of each of the recognition areas determined by the input track detection means, and determines whether or not the input operation on the touch panel has been performed along the aperture based on the calculation result.

In a sixth aspect, the input operation determination means performs a predetermined calculation based on the identification number of each of the recognition areas determined by the input track detection means and an order by which the recognition areas were determined by the input track detection means, and determines whether or not the input operation on the touch panel has been performed along the aperture based on the calculation result.

In a seventh aspect, the game apparatus further comprises time duration detection means for, when the input track detection means detects each recognition area, detecting a time duration from the time when the immediately prior recognition area was detected. The input track detection means performs a predetermined calculation based on the identification number of each of the recognition areas determined by the input track detection means and the time durations corresponding to the recognition areas detected by the time duration detection means, and determines whether or not the input operation on the touch panel has been performed along the aperture based on the calculation result.

In an eighth aspect, the game apparatus further comprises a microphone, and voice input detection means for, when each recognition area is determined by the input track detection means, determining whether or not a voice input from the microphone has been made. The input track detection means performs a predetermined calculation based on the identification number of each of the recognition areas determined by the input track detection means and the determination result made by the voice input detection means in correspondence with each of the recognition areas, and determines whether or not the input operation on the touch panel has been performed along the aperture based on the calculation result.

In a ninth aspect, the game apparatus further comprises additional information section means for selecting one of a plurality of pieces of prepared additional information in accordance with an instruction by a player. The input track detection means performs a predetermined calculation based on the identification number of each of the recognition areas determined by the input track detection means and the additional information selected by the additional information selection means when each recognition area was determined, and determines whether or not the input operation on the touch panel has been performed along the aperture based on the calculation result.

In a tenth aspect, the card has a mark indicating a sliding direction of the input operation along the aperture of the card.

An eleventh aspect of the present example embodiment is directed to a game apparatus comprising a touch panel, determination information storage means, input track detection means, input operation determination means, and event generation means. The touch panel allows a card having at least one aperture formed of a hole or a cut-out portion having a predetermined shape to be placed thereon. The determination information storage means is for storing determination information for determining whether or not an input operation on the touch panel has been performed along the aperture of the card in the state where the card is placed at the predetermined position of the touch panel. The input track detection means is for detecting an input track based on a signal from the touch panel. The input operation determination means is for determining whether or not the input operation on the touch panel has been performed along the aperture of the card based on the input track detected by the input track detection means and the determination information stored by the determination information storage means. The event generation means is for generating an event which changes the progress of a game when the input operation determination means determines that the input operation on the touch panel has been performed along the aperture.

A twelfth aspect of the present example embodiment is directed to a computer-readable storage medium having stored thereon a game program for a game system including a game apparatus having a touch panel, and a card which is detachably mountable at a predetermined position of the touch panel and has at least one aperture formed of a hole or a cut-out portion having a predetermined shape. The game program causes the game apparatus to function as determination information storage means, input track detection means, input operation determination means, and event generation means. The determination information storage means is for storing determination information for determining whether or not an input operation on the touch panel has been performed along the aperture of the card in the state where the card is placed at the predetermined position of the touch panel. The input track detection means is for detecting an input track based on a signal from the touch panel. The input operation determination means is for determining whether or not the input operation on the touch panel has been performed along the aperture of the card based on the input track detected by the input track detection means and the determination information stored by the determination information storage means. The event generation means is for generating an event which changes the progress of a game when the input operation determination means determines that the input operation on the touch panel has been performed along the aperture.

According to the present example embodiment, it is determined whether or not an input track detected by the input track detection means has been made by an input operation along an aperture of a card. When the input track is determined to have been made by an input operation along an aperture of a card, an event which influences the progress of the game is generated. Thus, a novel game system capable of changing the progress of the game by an operation of tracing the aperture of the card can be provided.

Especially according to the fifth aspect, the direction in which the input track was drawn can be determined. Therefore, it is made possible to change the progress of the game only when the input track is drawn in a predetermined direction, or to generate a different event in accordance with a different direction of the input track.

According to the sixth aspect, the determination information storage means needs to store only a value of the calculation result instead of a great number of pieces of identification information. Therefore, the storage area can be used efficiently.

Especially according to the seventh through ninth aspects, it can be determined whether or not a predetermined input operation has been performed based on the time interval at which the recognition areas were detected, presence/absence of a voice input from the microphone, and the type of additional information selected by the player, as well as the shape of the aperture. Thus, various types of input operations can be distinguished even when the shape of the aperture in the card is the same.

These and other features, aspects and advantages of the present example embodiment will become more apparent from the following detailed description of the present example embodiment when taken in conjunction with the accompanying drawings

BRIEF DESCRIPTION OF THE DRAWINGS

FIG. 6 shows a specific example of comparative track information;

FIG. 10 is a flowchart illustrating a flow of event generation processing;

FIG. 19 shows another specific example of the determination information;

FIG. 20 shows still another specific example of the determination information;

DESCRIPTION OF THE PREFERRED EMBODIMENTS

Hereinafter, a structure and an operation of a game apparatus according to one embodiment will be described.

Figure 1:
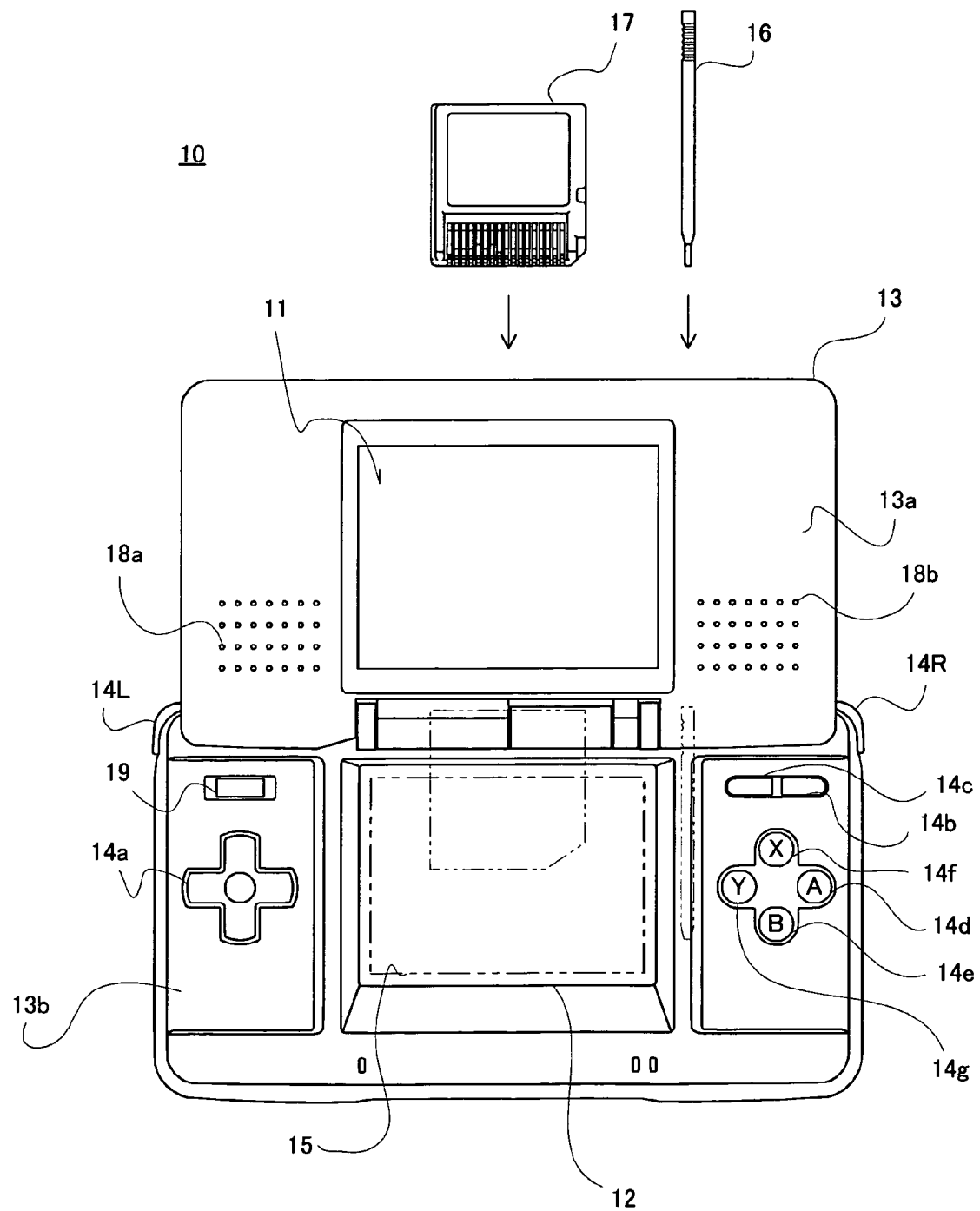
FIG. 1 is an external view of a game apparatus according to one embodiment.

FIG. 1 is an external view of a game apparatus according to one embodiment As shown in FIG. 1, a game apparatus 10 includes a first LCD (Liquid Crystal Display) 11 and a second LCD 12. A housing 13 includes an upper housing 13a and a lower housing 13b. The first LCD 11 is accommodated in the upper housing 13a, and the second LCD 12 is accommodated in the lower housing 13b. The first LCD 11 and the second LCD 12 both have a resolution of 256 dots×192 dots. In this embodiment, LCDs are used as display devices, but the present invention is applicable to apparatuses using other arbitrary display devices such as EL (Electro Luminescence) devices or the like. The display devices may have any resolution.

The upper housing 13a has speaker holes 18a and 18b for releasing a sound from a pair of speakers (represented with reference numerals 30a and 30b in FIG. 2) described later.

The lower housing 13b has a cross-shaped switch 14a, a start switch 14b, a select switch 14c, an A button 14d, a B button 14e, an X button 14f, a Y button 14g, an L button 14L and an R button 14R provided thereon as input elements. A touch panel 15 is attached to a screen of the second LCD 12 as an additional input element. The lower housing 13b has a power switch 19 and insertion holes for accommodating a memory card 17 and a stick 16.

The touch panel 15 may be of any system; for example, a resistance film system, an optical (infrared) system, or a static capacitance coupling system. The touch panel 15 has a function of, when a surface thereof is touched with the stick 16, outputting coordinate data corresponding to the position of the surface touched by the stick 16. Hereinafter, the player operates the touch panel 15 using the stick 16. Alternatively, the player may operate the touch panel 15 using a pen (stylus pen) or his/her finger instead of the stick 16. In this embodiment, the touch panel 15 has a resolution of 256 dots×192 dots (detection precision) like the second LCD 12. It is not absolutely necessary that the touch panel 15 has the same resolution as that of the second LCD 12.

The memory card 17 is a storage medium having a game program stored thereon, and is detachably attachable into the insertion hole of the lower housing 13b.

Next, with reference to FIG. 2, an internal structure of the game apparatus 10 will be described.

Figure 2:
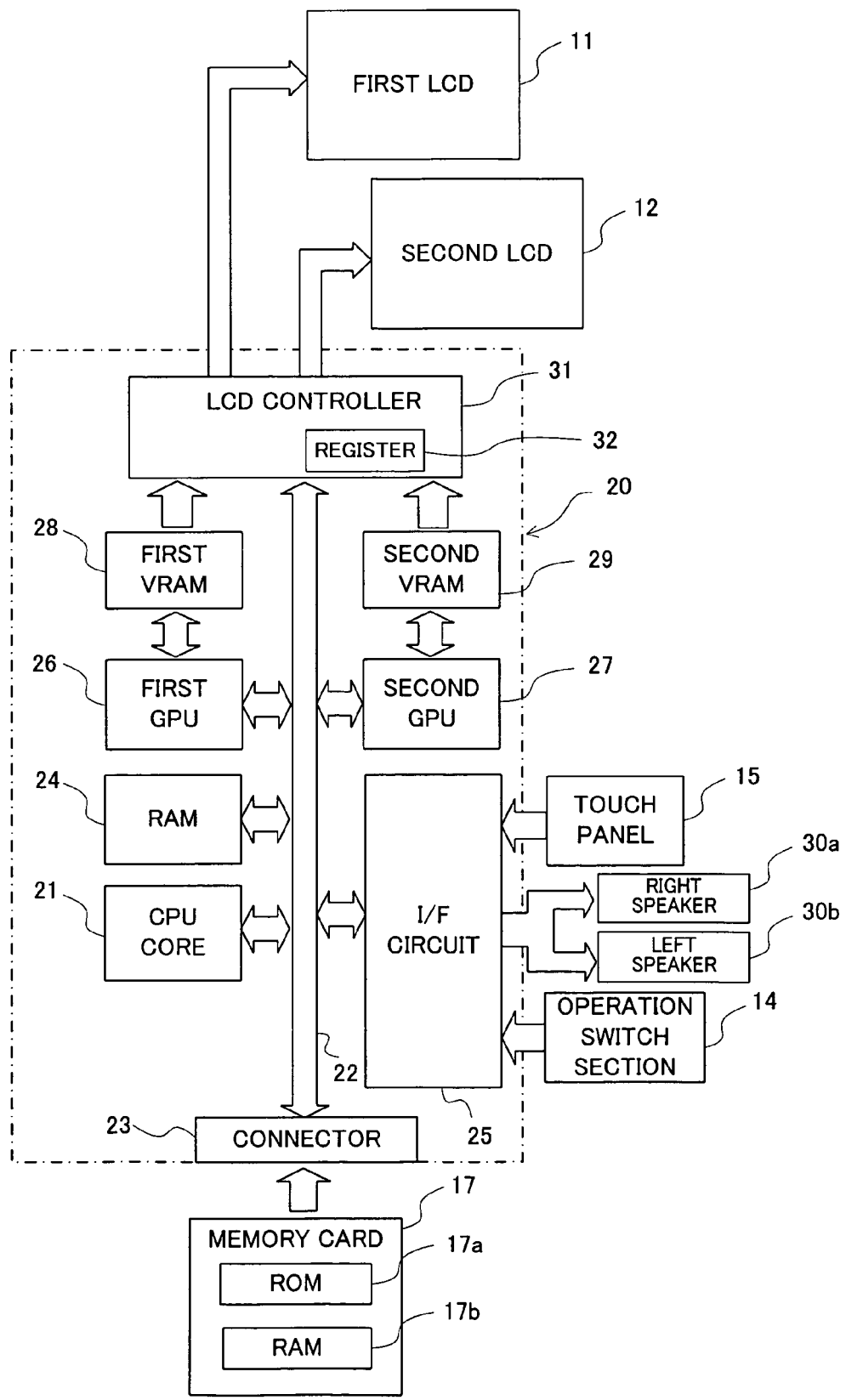
FIG. 2 is a block diagram showing an internal structure of the game apparatus according to one embodiment.

As shown in FIG. 2, a CPU core 21 is mounted on an electronic circuit board 20 accommodated in the housing 13. The CPU core 21 is connected to a connector 23, and is also connected to an input/output interface circuit (represented as "I/F circuit" in FIG. 2) 25, a first GPU (Graphics Processing Unit) 26, a second GPU 27, a RAM 24 and an LCD controller 31, via a bus 22. The memory card 17 is detachably connected to the connector 23. The memory card 17 includes a ROM 17a having a game program stored thereon and a RAM 17b having backup data rewritably stored thereon. The game program stored on the ROM 17a of the memory card 17 is loaded onto the RAM 24, and the game program loaded onto the RAM 24 is executed by the CPU core 21. The RAM 24 stores temporary data obtained by the execution of the game program by the CPU core 21 and data for generating game images, as well as the game program. The I/F circuit 25 is connected to the touch panel 15, a right speaker 30a, a left speaker 30b, and an operation switch section 14 including the cross switch 14a, the A button 14d and the like shown in FIG. 1. The right speaker 30a and the left speaker 30b are respectively located inside the speaker holes 18a and 18b.

The first GPU 26 is connected to a first VRAM (Video RAM) 28, and the second GPU 27 is connected to a second VRAM 29. In response to an instruction from the CPU core 21, the first GPU 26 generates a first game image based on the data for generating a game image stored on the RAM 24, and draws the first game image in the first VRAM 28. Similarly, in response to an instruction from the CPU core 21, the second GPU 27 generates a second game image and draws the second game image in the second VRAM 29. The first VRAM 28 and the second VRAM 29 are connected to the LCD controller 31.

The LCD controller 31 includes a register 32. The register 32 stores the value of "0" or "1" in accordance with an instruction from the CPU core 21. When the value in the register 32 is "0", the LCD controller 31 outputs the first game image drawn in the first VRAM 28 to the first LCD 11, and outputs the second game image drawn in the second VRAM 29 to the second LCD 12. When the value in the register 32 is "1", the LCD controller 31 outputs the first game image drawn in the first VRAM 28 to the second LCD 12, and outputs the second game image drawn in the second VRAM 29 to the first LCD 11.

The above-described structure of the game apparatus 10 is merely exemplary. The present example embodiment is applicable to any computer system including a touch panel. A game program according to the present example embodiment may be supplied to a computer system via an external memory medium such as the memory card 17 or the like, or via a wired or wireless communication line. A game program may be pre-stored on a non-volatile memory device in an computer system.

Figure 3:
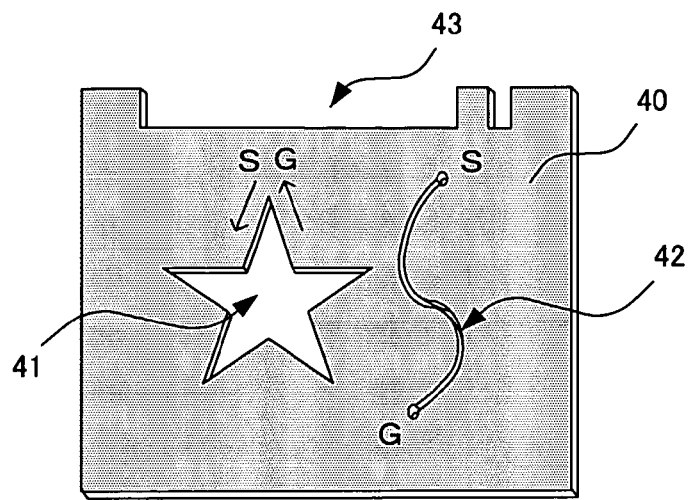
FIG. 3 shows a specific example of a card.
Figure 4:
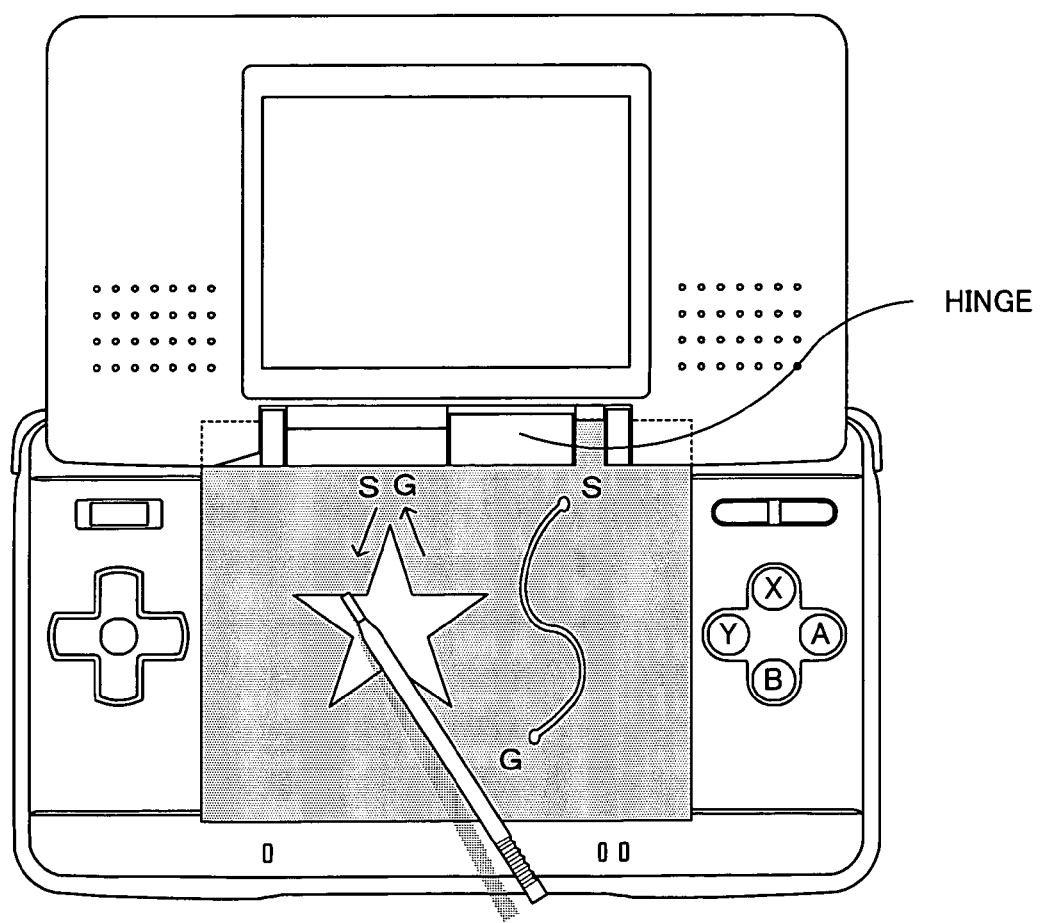
FIG. 4 shows a card placed at a predetermined position of a touch panel.

FIG. 3 shows an example of a card according to this embodiment.

A card 40 has an aperture formed of a hole 41 and an aperture formed of a cut-out portion 42. These apertures will be referred to also as an "aperture 41" or an "aperture 42". In the example in FIG. 3, one card has two apertures. The present invention is not limited to this, and one card may have one aperture or three or more apertures. The hole 41 or the cut-out portion 42 may have any shape.

In the vicinity of each of the apertures 41 and 42, a character "S" representing the position at which an input operation is to be started and a character "G" representing the position at which the input operation is to be terminated are shown. In the vicinity of the aperture 41, arrows representing the direction in which the input operation is to be performed (i.e., the direction in which the stick 16 is to be slid on the touch panel 15) are shown. Any symbol which represents the direction of the input operation is usable for the card 40. When no specific direction of the input operation is to be defined, such a symbol is not necessary.

A player places the card 40 on the touch panel 15 of the game apparatus 10, and performs an input operation along the aperture 41 or 42. The card 40 has a cut-off portion 43. The player can locate the card 40 accurately at a predetermined position by engaging the cut-off portion 43 with a hinge of the game apparatus 10.

In the state where the card 40 is placed at an appropriate position on the touch panel 15, the player slides the stick 16 along the profile of the aperture 41. Then, an event which is associated with the aperture 41 and influences the progress of a game is generated. Examples of such an event include acquiring a specific item, causing a specific character to appear in the game world, and causing a player character to move to the next stage. Similarly, when the player slides the stick 16 along the cut-out of the aperture 42 in the state where the card 40 is placed a tan appropriate position on the touch panel 15, an event associated with the aperture 42 is generated.

An event which can be generated using the card 40 is desirably a special event which is not generated by playing the game in a usual manner (for example, acquiring a special item which cannot be acquired by playing the game in a usual manner). By such a setting, the value of the card 40 itself can be improved. The card 40 may be, for example, appended to a magazine so as to be available only to the people who purchased the magazine. In the case where a special event is set to be generated by an input of a password, there may be a problem that anybody who has learned the password can easily acquire the special item. However, in the case of the present example embodiment, it is very difficult for a person who does not possess the card 40 to accurately perform the input operation as if he/she possessed the card 40. Therefore, the value of the card 40 is not easily lost.

Next, the operation of the game apparatus 10 will be described in detail.

Figure 5:
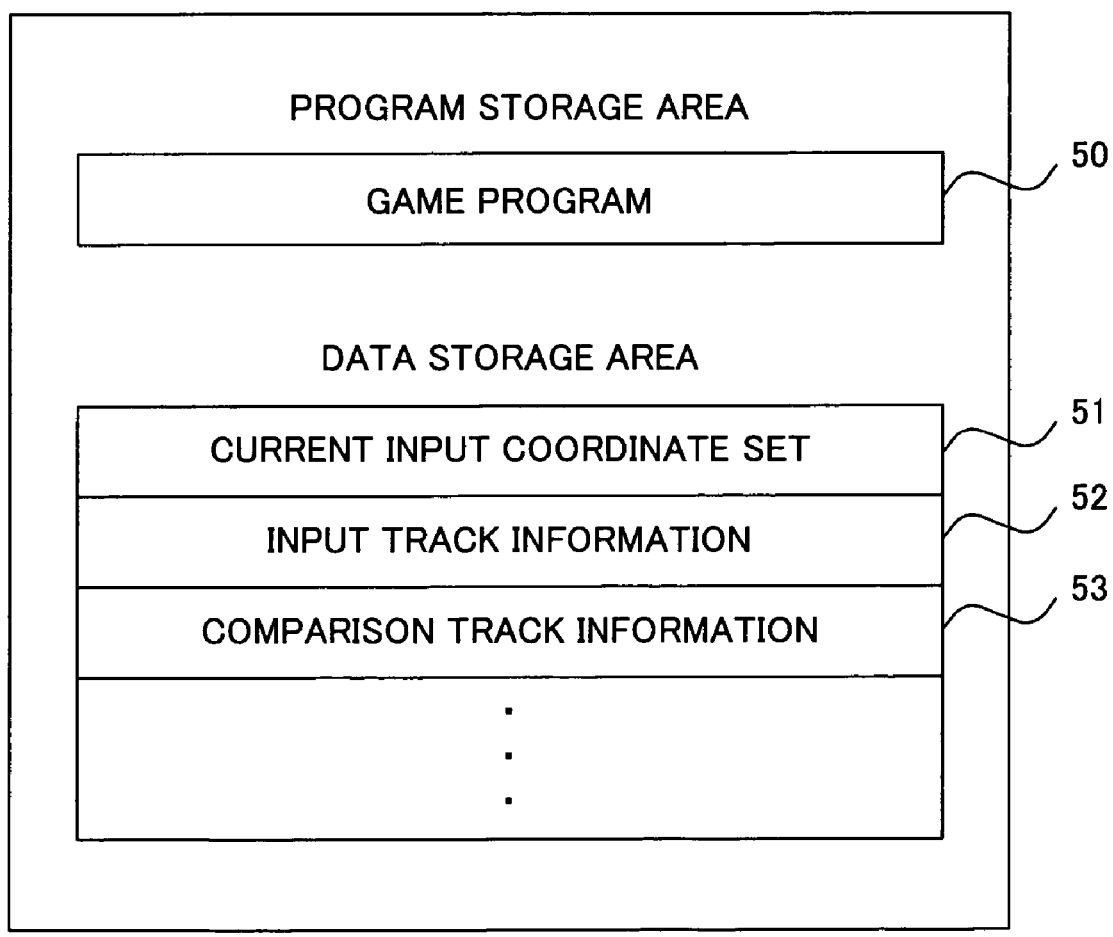
FIG. 5 shows a memory map of a RAM.

FIG. 5 shows a memory map of the RAM 24. The RAM 24 includes, for example, a game program 50, a current input coordinate set 51, input track information 52, and comparative track information 53.

The game program 50 is for causing the CPU core 21 to execute game processing. Before the execution of the game is started, the game program 51 is loaded from the ROM 17a of the memory card 17 onto the RAM 24.

The current input coordinate set 51 is an input coordinate set detected based on a signal from the touch panel 15. The detection of the input coordinate set is performed periodically (e.g., every frame period), and so the current input coordinate set 51 is also updated periodically.

The input track information 52 represents a track of positions at which the stick 16 contacted the touch panel 15 (input track) when a slide operation (an operation of sliding the stick 16 on the touch panel 15) is performed. The input track information 52 includes a plurality of pieces of coordinate set data. From the time when the stick 16 contacts the touch panel 15 until the stick 16 is taken off from the touch panel 15, the current input coordinate set 51 is sequentially added to the input track information 52. Thus, the input track information 52 is updated when necessary.

The comparative track information 53 is a type of determination information for determining whether the input track on the touch panel 15 is based on an input operation performed along one of the apertures 41 and 42 of the card 40. The comparative track information 53 includes a plurality of pieces of coordinate set data, which correspond to the track of the stick 16 sliding along the aperture 41 or 42 in the state where the card 40 is placed accurately at a predetermined position on the touch panel 15. The comparative track information 53 is loaded from the ROM 17a of the memory card 17 onto the RAM 24.

FIG. 6 shows a specific example of the comparative track information 53. The comparative track information 53 defines a collection of apex coordinate set data and an event in correspondence with each aperture. Hereinafter, a track represented by the collection of apex coordinate set data in the comparative track information 53 will be referred to as a "comparative track". In FIG. 6, the number of apexes of the comparative track of an aperture A and the number of apexes of the comparative track of an aperture B are both 21 (apex P0 through apex P20). These are merely exemplary, and the number of the apexes of the comparative tracks is arbitrary. The number of the apexes may be different among different comparative tracks.

Next, with reference to the flowchart of FIG. 7, a flow of processing executed by the CPU core 21 based on the game program 50 will be described.

In step S10, the game processing based on an operation of the player (for example, an operation on the operation switch section 14 or the touch panel 15) is executed.

Figure 8:
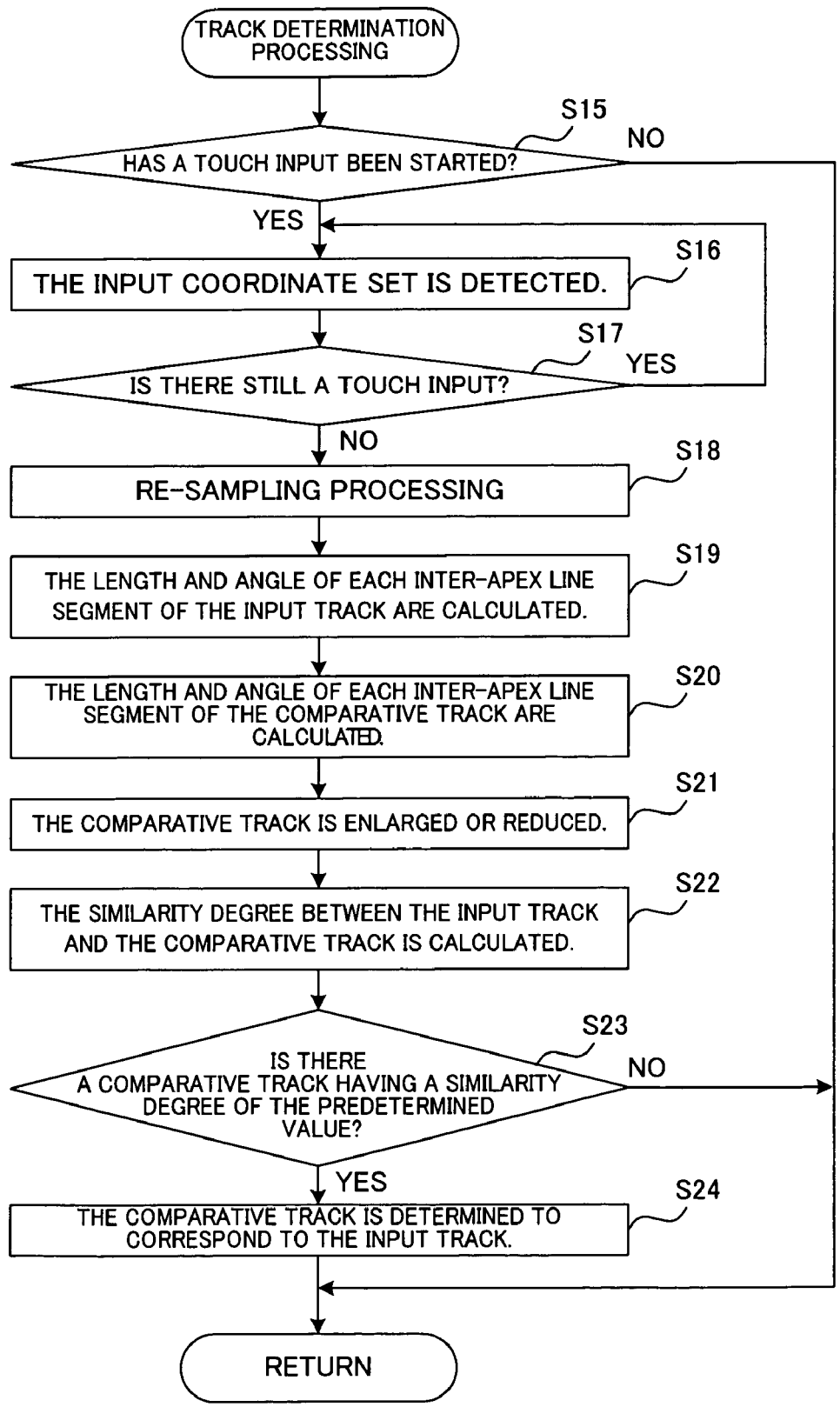
FIG. 8 is a flowchart illustrating a flow of track determination processing.

In step S11, track determination processing is executed. With reference to FIG. 8, the track determination processing will be described in detail.

Referring to FIG. 8, in step S15, it is determined whether or not a touch input has been started based on a signal from the touch panel 15. When the touch input has been started, the processing advances to step S16; whereas when the touch input has not been started, the processing advances to step S12 in FIG. 7.

In step S16, an input coordinate set is detected based on a signal from the touch panel 15, and stored on the RAM 24 as a current input coordinate set 51. At the same time, the input track information 52 in the RAM 24 is updated.

In step S17, it is determined whether or not the touch input still continues based on a signal from the touch panel 15. When there is still a touch input, the processing returns to step S16; whereas when there is no touch input anymore (i.e., when the stick 16 has been taken off from the touch panel 15), the processing advances to step S18. Instep S18 et seq., the input track detected based on the signal from the touch panel 15 is checked against each comparative track included in the comparative track information 53. For this checking, any known graphics recognition technology is usable. The checking procedure described below may be appropriately changed or omitted partially when necessary.

Figure 9A:
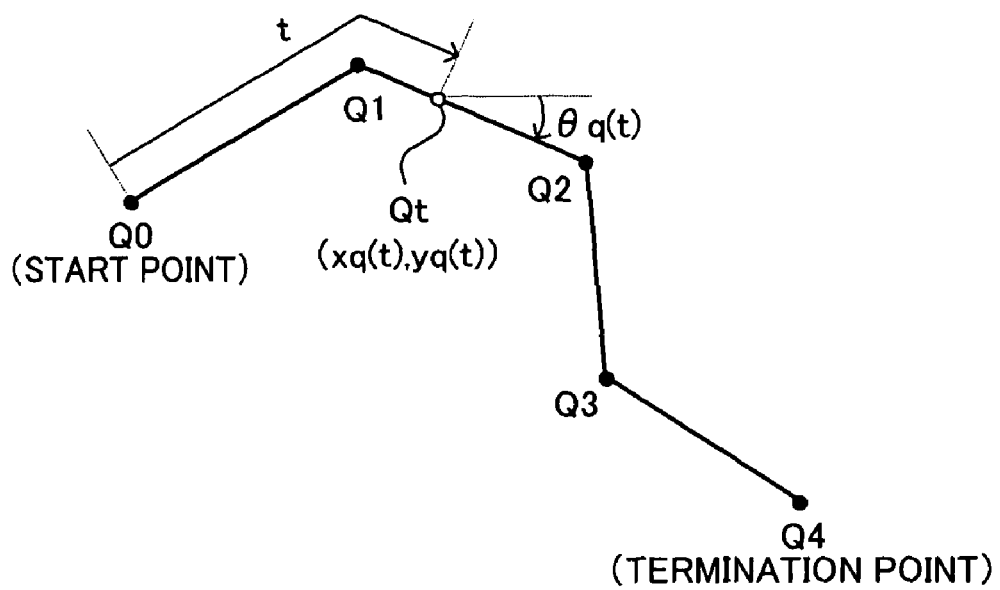
FIG. 9A shows a specific example of an input track.

In step S18, re-sampling processing is executed on the plurality of pieces of coordinate set data which are stored in the input track information 52 of the RAM 24 and represent the input track. The re-sampling processing is executed, for example, as follows. Among the plurality of pieces of coordinate set data having an identical coordinate value detected continuously time-wise, the coordinate set data other than the coordinate set data which was first detected is discarded. Alternatively, the coordinate set data is extracted one piece by one piece at an interval of a predetermined distance from the start point (i.e., the position of the coordinate set data detected when the touch input was started) FIG. 9A shows an example of the input track after the re-sampling processing.

In step S19, referring to the plurality of pieces of coordinate set data (apex data) after the re-sampling processing which represents the input track, the length and angle of each line segment between the apexes of the input track are calculated. For example, in the case of FIG. 9A, the length and angle (θq0) of the line segment connecting apex Q0 (start point) and apex Q1, the length and angle (θq1) of the line segment connecting apex Q1 and apex Q2, the length and angle (θq2) of the line segment connecting apex Q2 and apex Q3, and the length and angle (θq3) of the line segment connecting apex Q3 and apex Q4 (termination point) are calculated. The calculation results are temporarily stored in an appropriate storage area of the RAM 24.

Figure 9B:
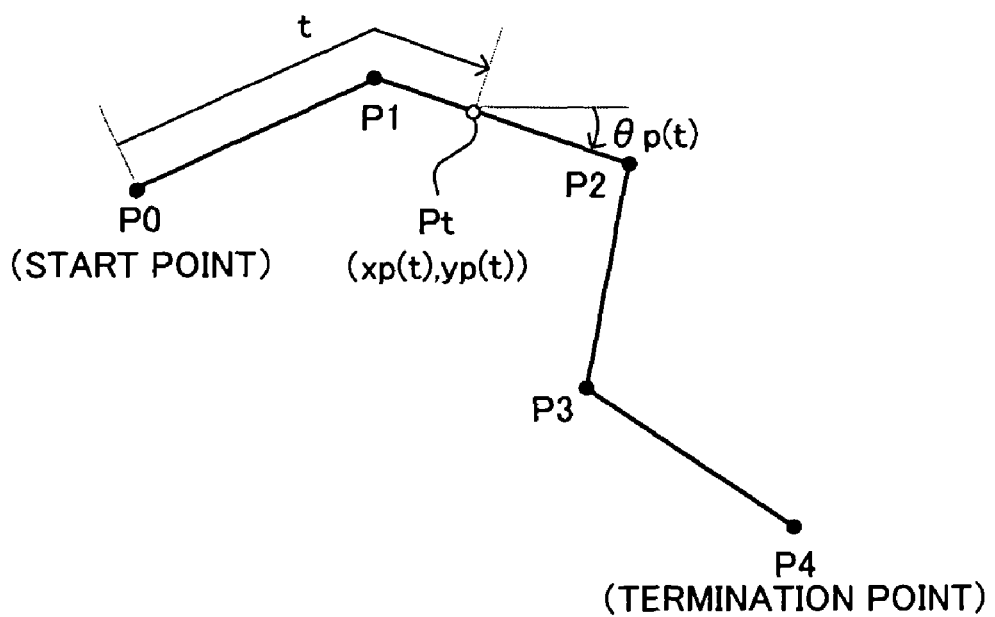
FIG. 9B shows a specific example of a comparative track.

Instep S20, referring to the apex data in the comparative track corresponding to each aperture which is defined in the comparative track information 53, the length and angle of each segment between the apexes of each comparative track are calculated. FIG. 9B shows an example of the comparative track defined in the comparative track information 53. For example, in the case of FIG. 9B, the length and angle (θp0) of the line segment connecting apex P0 (start point) and apex P1, the length and angle (θp1) of the line segment connecting apex P1 and apex P2, the length and angle (θp2) of the line segment connecting apex P2 and apex P3, and the length and angle (θp3) of the line segment connecting apex P3 and apex P4 (termination point) are calculated. The calculation results are temporarily stored in an appropriate storage area of the RAM 24. In this embodiment, the length and angle of each line segment of each comparative track are calculated in step S20. Alternatively, such information may be pre-stored in the ROM 17a of the memory card 17 and transferred from the ROM 17a to the RAM 24 at an appropriate timing.

In step S21, referring to the length of each inter-apex line segment in the input track calculated in step S19 and the length of each inter-apex line segment in each comparative track calculated in step S20, each comparative track is expanded or reduced based on, for example, the start point P0, such that the entire length of the input track is equal to the entire length of each comparative track. Instead of the comparative tracks, the input track may be expanded or reduced.

In step S22, values obtained by multiplying the differences between the angles and the differences between the positions are integrated. Specifically, this is performed as follows.

Regarding the input track and each comparative track, the length from the start point to a certain point (Qt, Pt) of each track is set as "t" (see FIG. 9A and FIG. 9B). The angle of the line segment of the input track passing through the point Qt (with respect to the X axis) is set as θq(t), the x coordinate of the point Qt is set as xq(t), and the y coordinate of the point Qt is set as yq(t). The angle of the line segment of the comparative track passing through the point Pt (with respect to the X axis) is set as θp(t), the x coordinate of the point Pt is set as xp(t), and the y coordinate of the point Pt is set as yp(t). The similarity degree between these coordinates is calculated using the following expression.

$$\int \{(1-(|\theta q(t)-\theta p(t)|/180 \text{ degrees})) \times$$
$$(1-((|xq(t)-xp(t)|+|yq(t)-yp(t)|)/$$
$$([\text{length of one side of a recognition area}] \times 2)))\}dt.$$

When a high precision is not required for checking the tracks, instead of the processing in step S22, the tracks may be checked based on, for example, the difference between the angle of an inter-apex line segment of the input track and the angle of the corresponding inter-apex line segment of the comparative track. In this case, a value obtained by integrating the differences between the angles is calculated. The similarity degree is calculated using the following expression.

$$\int\{(1-(|\theta q(t)-\theta p(t)|/180 \text{ degrees}))\}dt.$$

Similarly, when a high precision is not required for checking the tracks, instead of the processing in step S22, the tracks may be checked based on, for example, the difference between the position of an apex of the input track and the position of the corresponding apex of the comparative track. In this case, a value obtained by integrating the differences between the positions is calculated. The degree of similarity is calculated using the following expression.

$$\int\{(1-((|xq(t)-xp(t)|+|yq(t)-yp(t)|)/([\text{length of one side of a recognition area}] \times 2)))\}dt.$$

In step S23, it is determined whether or not there is a comparative track having a similarity degree with the input track of a predetermined threshold value (for example, 0.85) or greater. When there is such a comparative track, the processing advances to step S24; whereas when there is no such comparative track, the processing advances to step S12 in FIG. 7.

Figure 7:
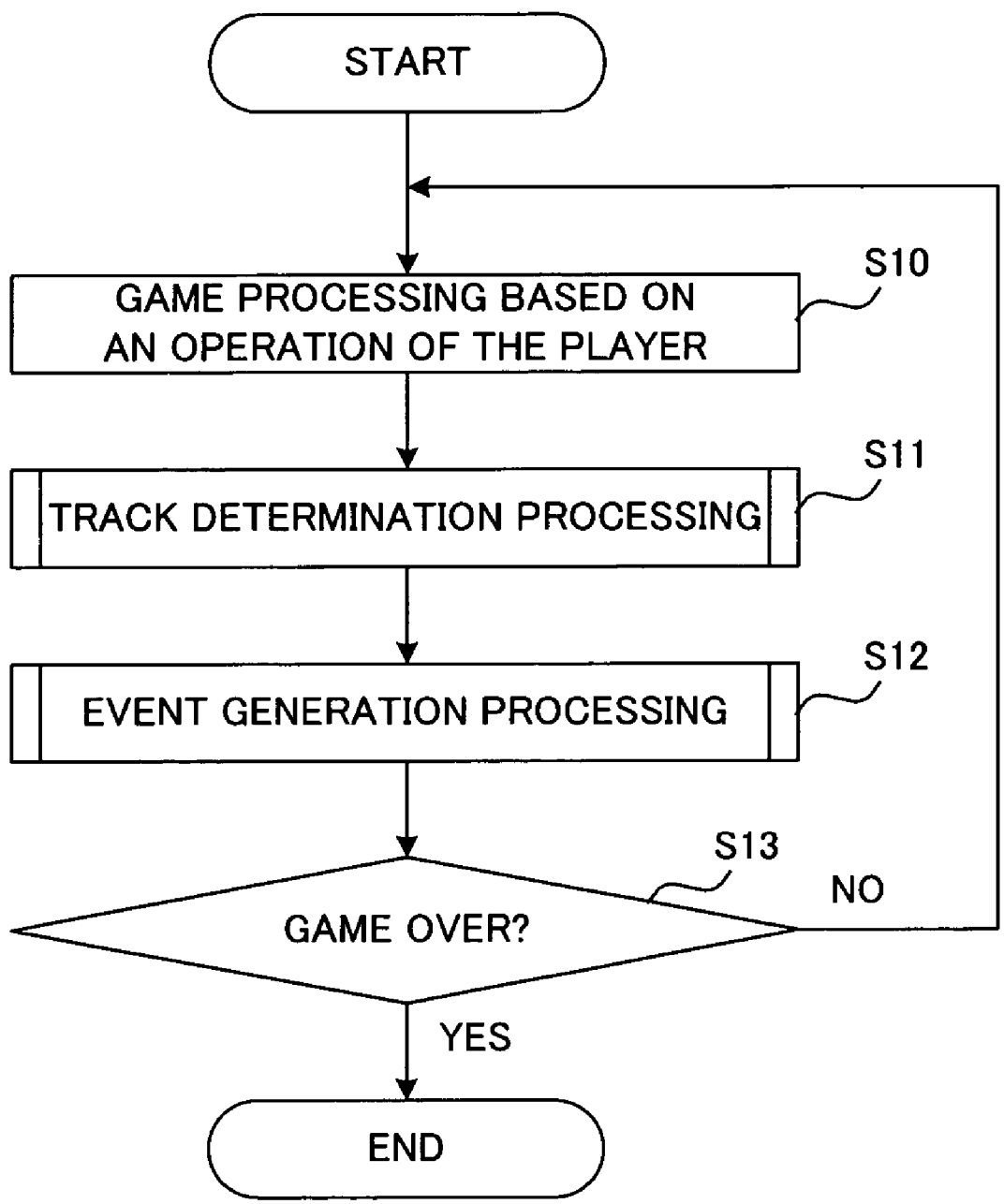
FIG. 7 is a flowchart illustrating a flow of processing executed based on a game program.

In step S24, the comparative track determined to have a similarity degree of the predetermined threshold value or greater is determined as a comparative track corresponding to the input track, and the processing advances to step S12 in FIG. 7.

In step S12 in FIG. 7, event generation processing is executed. With reference to FIG. 10, the event generation processing will be described in detail.

Referring to FIG. 10, in step S29, it is determined whether or not a comparative track corresponding to the input track was determined in step S24 in FIG. 8. When such a comparative track was determined, the processing advances to step S30; whereas when no such comparative track was determined, the processing advances to step S13 in FIG. 7.

In step S30, an event corresponding to the comparative track which is determined to correspond to the input track is generated based on the comparative track information 53, and then the processing advances to step S13 in FIG. 7.

In step S13 in FIG. 7, it is determined whether or not the game is to be over. When the game is to be over, the execution of the game program 50 is terminated; whereas when the game is not to be over, the processing returns to step S10.

As described above, according to this embodiment, a novel game system capable of changing the progress of the game by an operation of tracing the aperture of the card performed by the player is provided.

In the above embodiment, a comparative track corresponding to the input track is determined using, as determination information, apex data of the comparative tracks. The present example embodiment is not limited to this. Hereinafter, various modifications of this embodiment will be described.

(First Modification)

Figure 11:
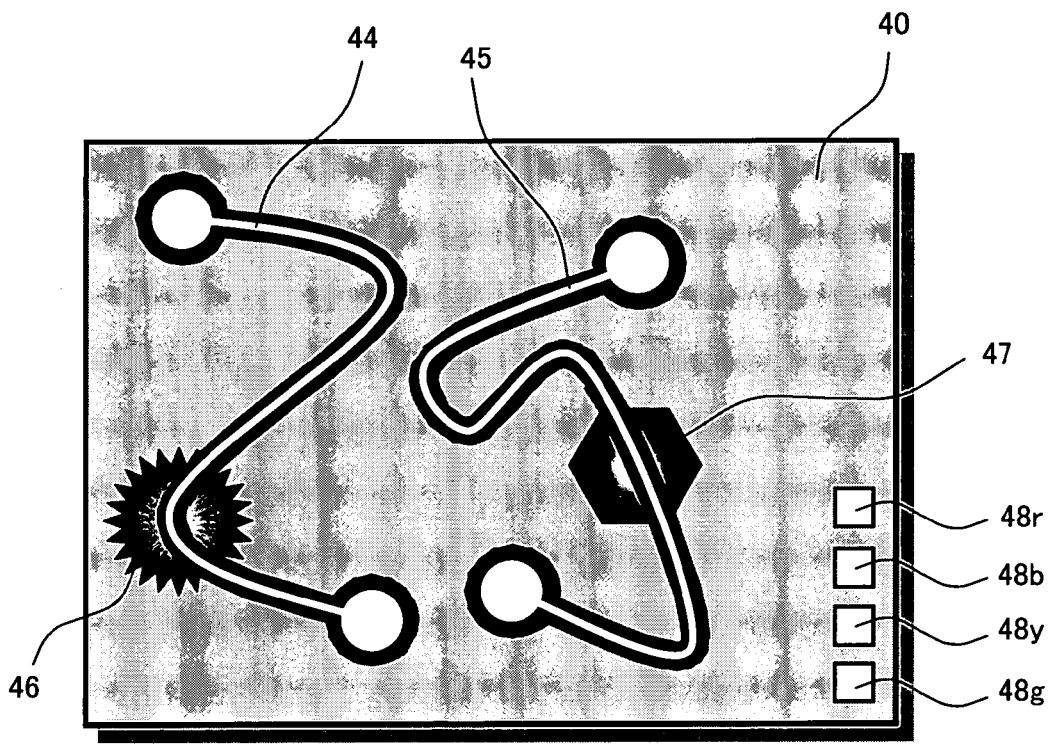
FIG. 11 shows another example of the card.

FIG. 11 shows an example of a card 40 usable in a first modification. The card 40 has two cut-out portions 44 and 45, and color change holes 48r, 48b, 48y and 48g. A microphone input indication mark 46 and a low speed indication mark 47 are shown on the card 40. The microphone input indication mark 46, the low speed indication mark 47, and the color change holes 48r, 48b, 48y and 48g will be described later.

Figure 12:
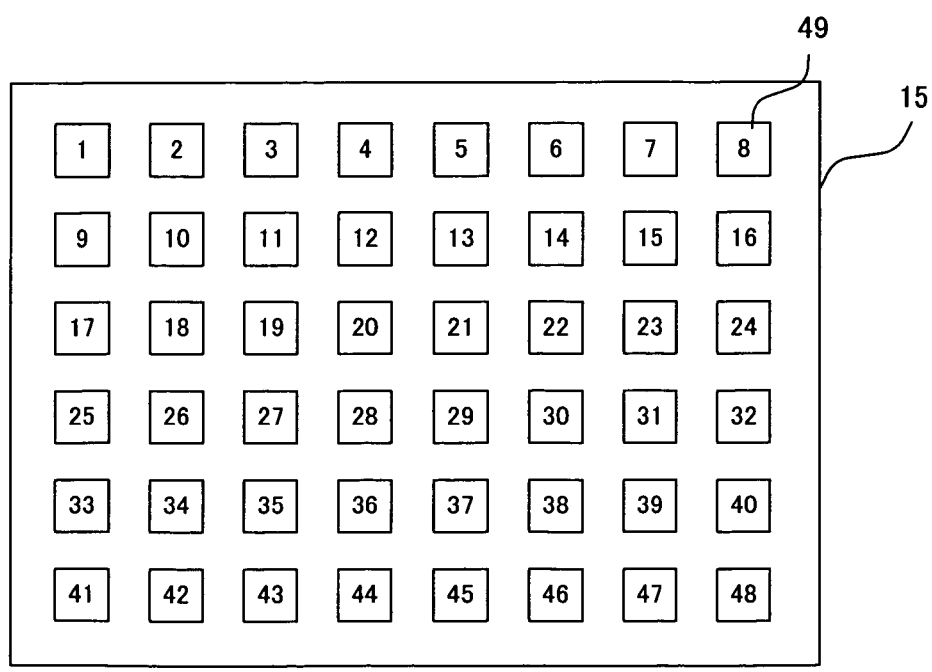
FIG. 12 shows an exemplary arrangement of recognition areas virtually provided on the touch panel.
Figure 13:
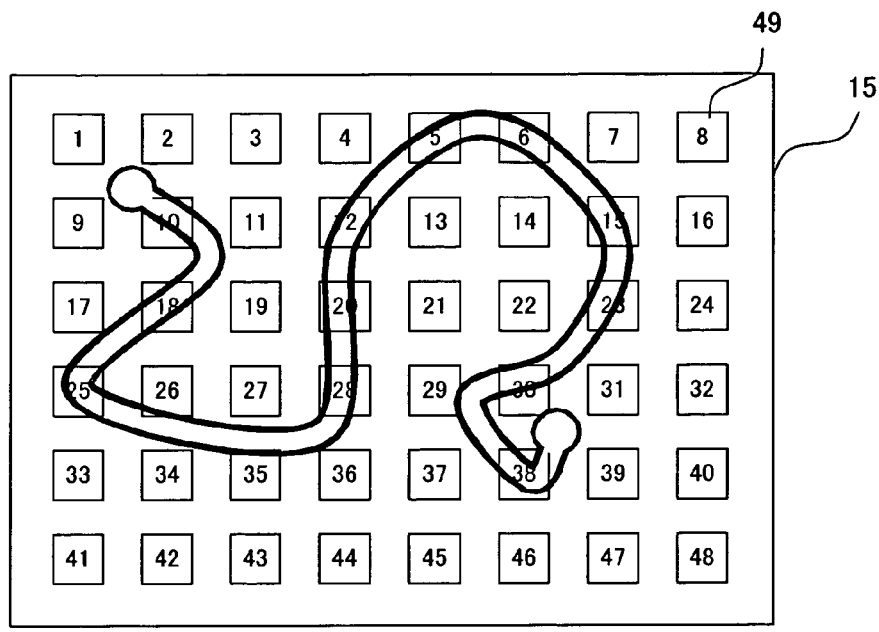
FIG. 13 shows an example of the positional relationship between an aperture and the recognition areas on the touch panel.
Figure 14:
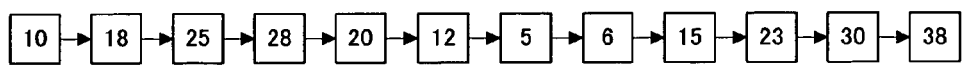
FIG. 14 shows an order of the recognition areas passed by the input coordinate set.

In this and the following modifications, as shown in FIG. 12, a plurality of recognition areas 49 are virtually set on an operation screen of the touch panel 15. Each recognition area 49 is assigned unique identification information (in the example in FIG. 12, the numerical figure of 1 through 48). In this modification, an input track is determined by detecting which recognition areas 49, and in which order, the input coordinate set passed as a result of a slide operation. For example, when an input operation is performed along an aperture shown in FIG. 13, the input coordinate set necessarily passes the recognition areas 49 shown in FIG. 14, and in the order also shown in FIG. 14. In this modification, information representing such a passing order of the recognition areas 49 as shown in FIG. 14 is stored as determination information. When the player actually performs an input operation, a passing order of the recognition areas 49 passed by the input operation performed by the player is checked against the determination information. Thus, it is easily determined whether or not the input operation performed by the player is along the aperture of the card 40.

Figure 15A:
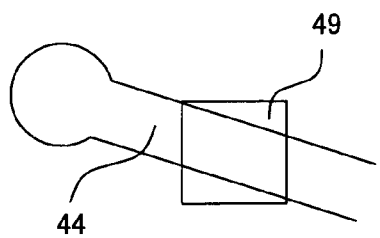
FIG. 15A shows an appropriate positional relationship between a cut-out portion and a recognition area.
Figure 15B:
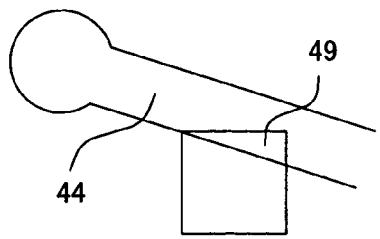
FIG. 15B shows an inappropriate positional relationship between a cut-out portion and a recognition area.

The cut-out portion in the card 40 is preferably formed to completely cross the corresponding recognition areas 49 as shown in FIG. 15A. If the cut-out portion crosses a recognition area 49 only partially as shown in FIG. 15B, even when the slide operation is properly performed along the cut-out portion, the input track may or may not pass the recognition areas 49. As a result, a wrong passing order of the recognition areas 49 may be detected, which may cause a wrong determination.

Figures 16, 17:
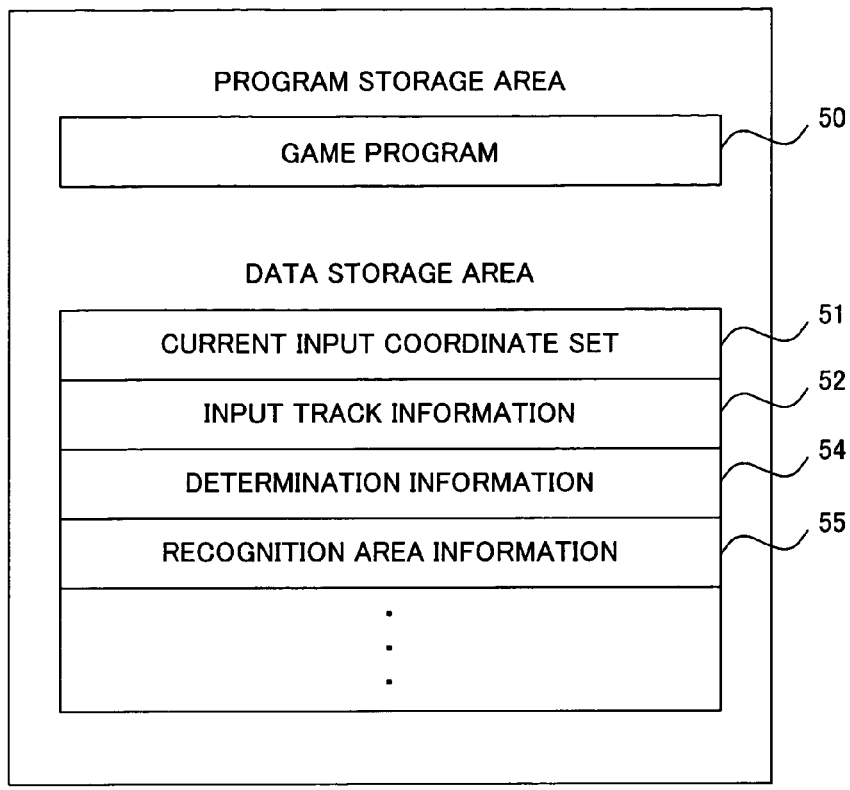
FIG. 16 shows a memory map of the RAM in a first modification.
FIG. 17 shows a specific example of determination information.

FIG. 16 shows an example of the memory map of the RAM 24 in the first modification. The game program 50, the current input coordinate set 51 and the input track information 52 are identical to those in FIG. 5, and thus will not be described. As shown in FIG. 17, determination information 54 defines information representing the passing order of the recognition areas 49 and an event in correspondence with each aperture. Recognition area information 55 represents the correspondence between the area on the touch panel 15 and the identification number as shown in FIG. 12.

Figure 18:
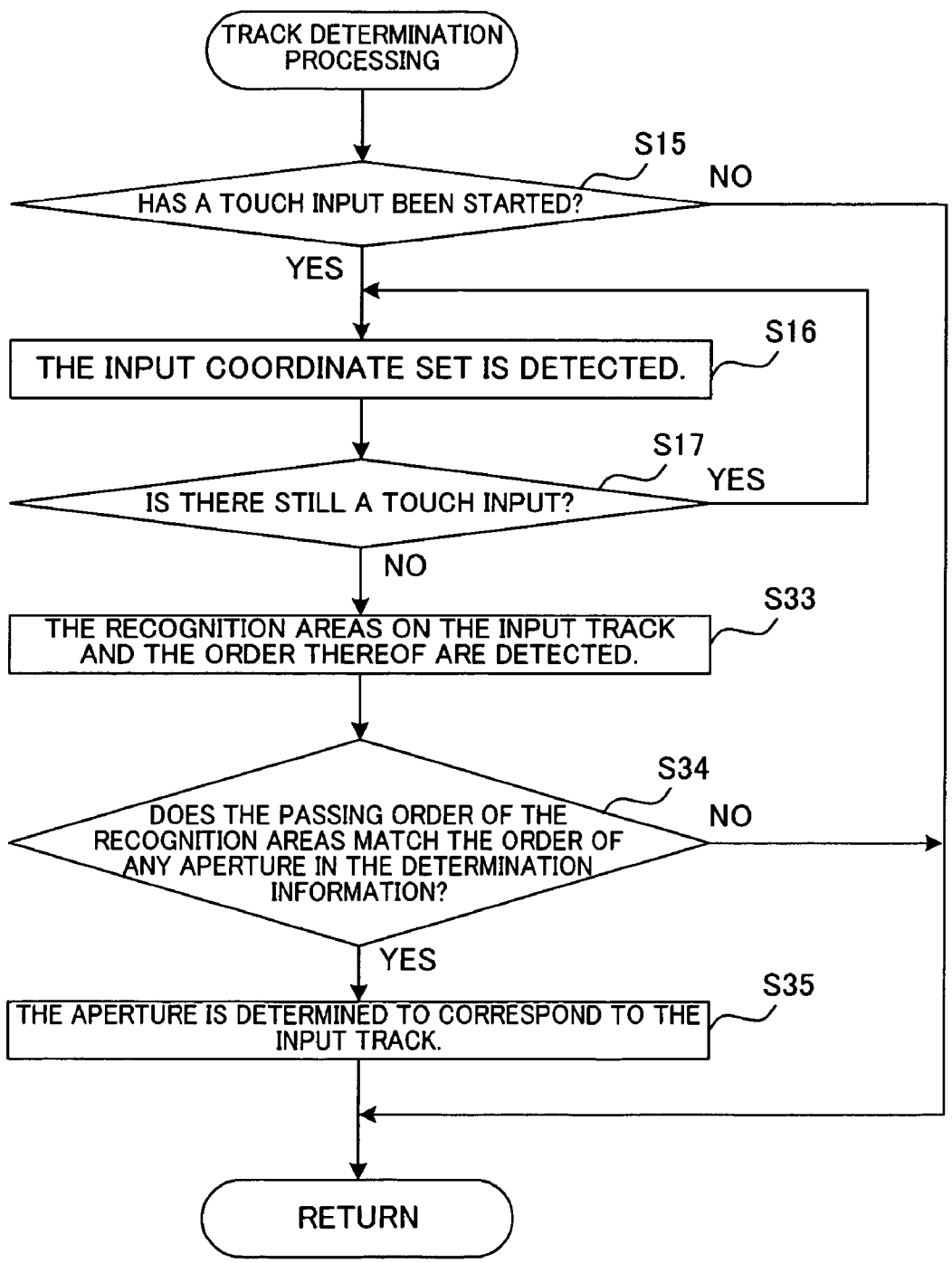
FIG. 18 is a flowchart illustrating a flow of track determination processing.

With reference to the flowchart of FIG. 18, the track determination processing in the first modification will be described. The processing in steps S15 through S17 is identical to that in FIG. 8 and will not be described.

In step S33, the recognition areas 49 existing on the input track and the passing order thereof are detected based on the input track information 52 and the recognition area information 55. The detected information (for example, the information as shown in FIG. 14) is temporarily stored in an appropriate storage area of the RAM 24.

In step S34, it is determined whether or not the information detected in step S33 matches the passing order of the recognition areas 49 corresponding to any aperture included in the determination information 54. When the information matches an aperture, the processing advances to step S35; whereas when the information does not match any aperture, the track determination processing is terminated. In step S35, the aperture determined to match the information detected in step S33 is determined as an aperture corresponding to the input track.

As described above, according to the first modification, a relatively simple technique is usable to determine whether or not the input operation on the touch panel 15 has been performed along the aperture and thus to generate an event corresponding to the determination result.

(Second Modification)

A second modification uses a value of a result of a predetermined calculation using the identification numbers of the recognition areas 49 and the passing order thereof as an argument, instead of the information on the passing order of the recognition areas 49 included in the determination information 54 as in the first modification. Hereinafter, the value of a result of the predetermined calculation will be referred to as a "track data conversion value d". For example, determination information 54 shown in FIG. 19 is used in the second modification, instead of the determination information 54 shown in FIG. 17. Since the size of the track data conversion value d is smaller than the size of the information on the passing order of the recognition areas 49, the memory area required for the determination information 54 in the second modification can be smaller than that of the first modification.

When the player performs a slide operation on the touch panel 15, the corresponding recognition areas 49 are sequentially detected along the transfer of the contact position. The identification numbers of the detected recognition areas 49, and the order in which the recognition areas 49 are detected, are subjected to a predetermined calculation. The calculation result is checked against the track data conversion value d included in the determination information 54 shown in FIG. 19. Thus, it is determined whether or not the input operation performed on the touch panel 15 is along the aperture.

In the above-described embodiment and modification, when the player performs one slide operation on the touch panel 15 (one slide operation is from the time when the stick 16 contacts the touch panel 15 until the stick 16 is taken off from the touch panel 15), the comparative track which matches one track corresponding to the slide operation is determined. In the second modification et seq., it is also determined whether or not the player traced a plurality of apertures of the card 40 in a predetermined order. For example, referring to the card 40 shown in FIG. 3, when the player performs a slide operation along the aperture 41 and then a slide operation along the aperture 42, a first event may be generated; and when the player performs a slide operation along the aperture 42 and then a slide operation along the aperture 41, a second event may be generated. Hereinafter, such a case will be described. Specifically, when the player performs a plurality of slide operations, a track data conversion value d corresponding to each slide operation and another value corresponding to the order of the slide operations are subjected to a predetermined calculation. Using the resultant value (track data conversion value v), the input track is checked. For example, in the case where the track data conversion value v calculated based on an input operation by the player is 6833, it is determined from the determination information 54 shown in FIG. 20 that a slide operation along an aperture C was first performed and then a slide operation along an aperture D was performed. Then, an event of "acquiring an item C" is generated.

With reference to the flowcharts of FIG. 21 through FIG. 23, an example of track data conversion value v calculation processing performed by the CPU core 21 to obtain a track data conversion value v will be described.

Figure 21:
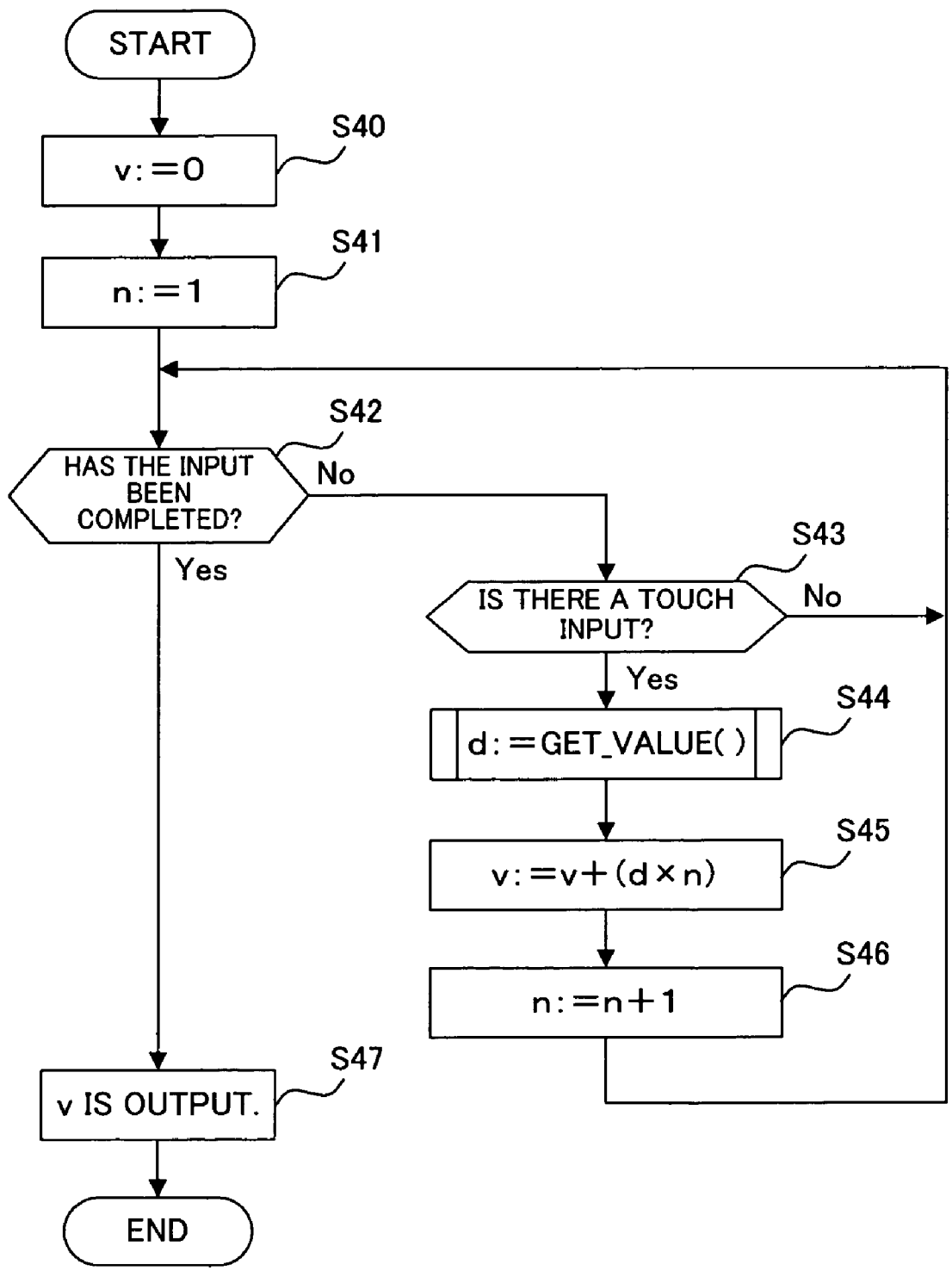
FIG. 21 is a flowchart illustrating a flow of processing executed by a CPU core 21 in a second modification.

Referring to FIG. 21, in step S40, the track data conversion value v is initialized to 0.

In step S41, a variable n is initialized to 1. The variable n represents a value obtained by adding "1" to the number of slide operations performed from the time when the player started the input operation until the current time.

In step S42, it is determined whether or not the input operation by the player has been completed. It cannot be determined whether or not the player completed a plurality of slide operations in a predetermined order merely by determining whether or not the player took off the stick 16 from the touch panel 15. Therefore, it is determined that the input operation by the player has been completed, for example, when the player presses a predetermined switch for indicating the completion of the input operation, or when a predetermined time passes after the player put the stick 16 into contact with the touch panel 15. When the input operation by the player has been completed, the processing advances to step S47; whereas when the input operation by the player has not been completed, the processing advances to step S43.

In step S43, it is determined whether or not there is a touch input (i.e., whether or not the stick 16 is in contact with the touch panel 15). When there is a touch input, the processing advances to step S44; whereas when there is no touch input, the processing returns to step S42.

In step S44, the track data conversion value d calculation processing is executed in order to obtain a track data conversion value d. This will be described in detail later.

In step S45, the track data conversion value v is updated. The update is performed based on the variable n and the track data conversion value d calculated in step S44. In this example, the track data conversion value v is updated by adding d×n to the value of v held at the current time. By this update, for example, the value of v obtained when a slide operation along the aperture C is performed and then a slide operation along the aperture D is performed is different from the value of v obtained when a slide operation along the aperture D is performed and then a slide operation along the aperture C is performed. Therefore, in which order the slide operations were performed can be determined based on the value of v. In this example, the update is performed by adding d×n to the value of v held at the current time. The present invention is not limited to this. The track data conversion value v may be updated in any other calculation technique.

In step S46, "1" is added to the variable n, and the processing returns to step S42.

In step S47, the value of v held at the current time is stored in a predetermined area of the RAM 24, and the track data conversion value v calculation processing is terminated. After this, the track data conversion value v obtained in this manner is checked against the track data conversion value v included in the determination information 54 to check the input track.

Figure 22:
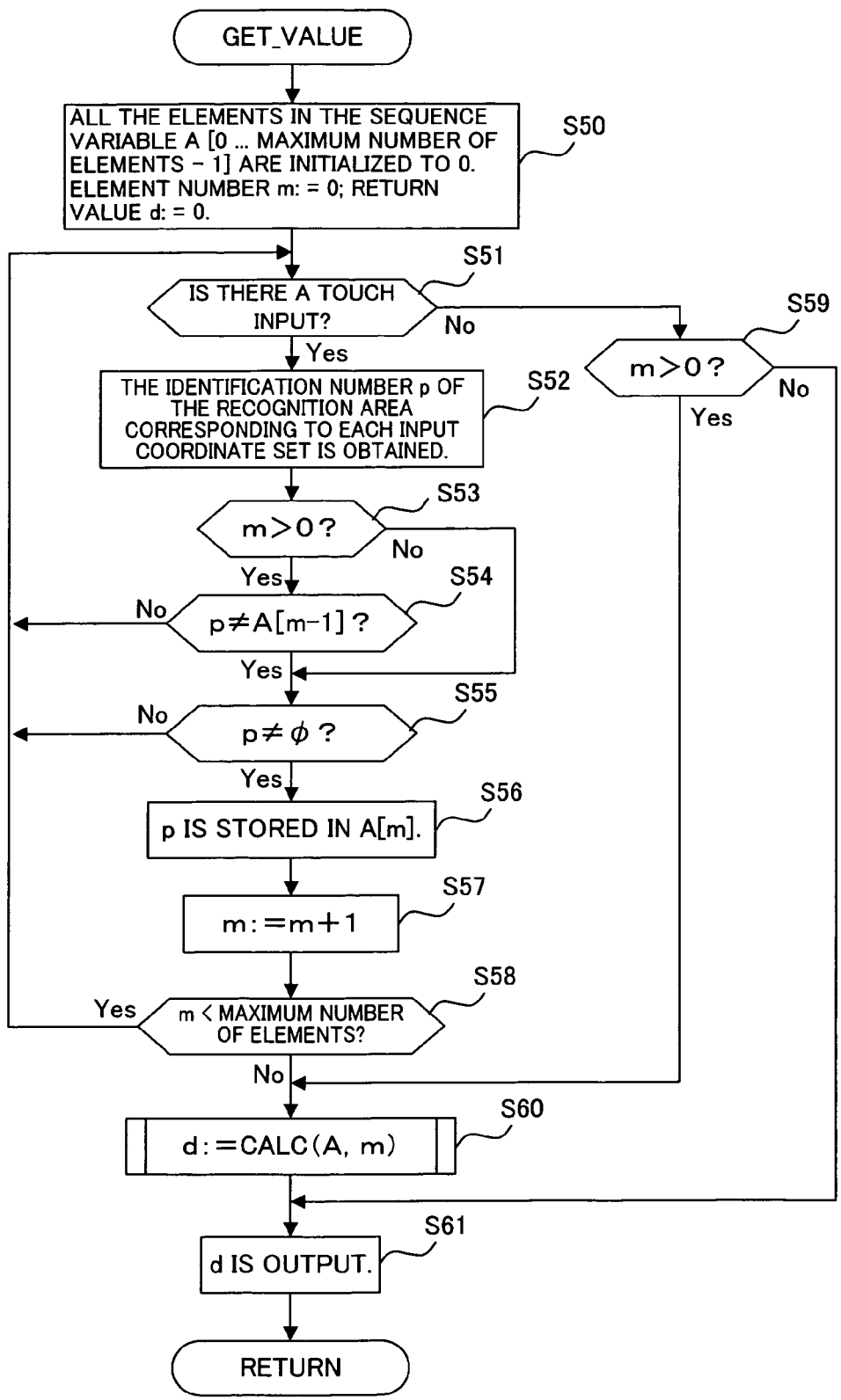
FIG. 22 is a flowchart illustrating a flow of obtaining a track data conversion value d in the second modification.
Figure 23:
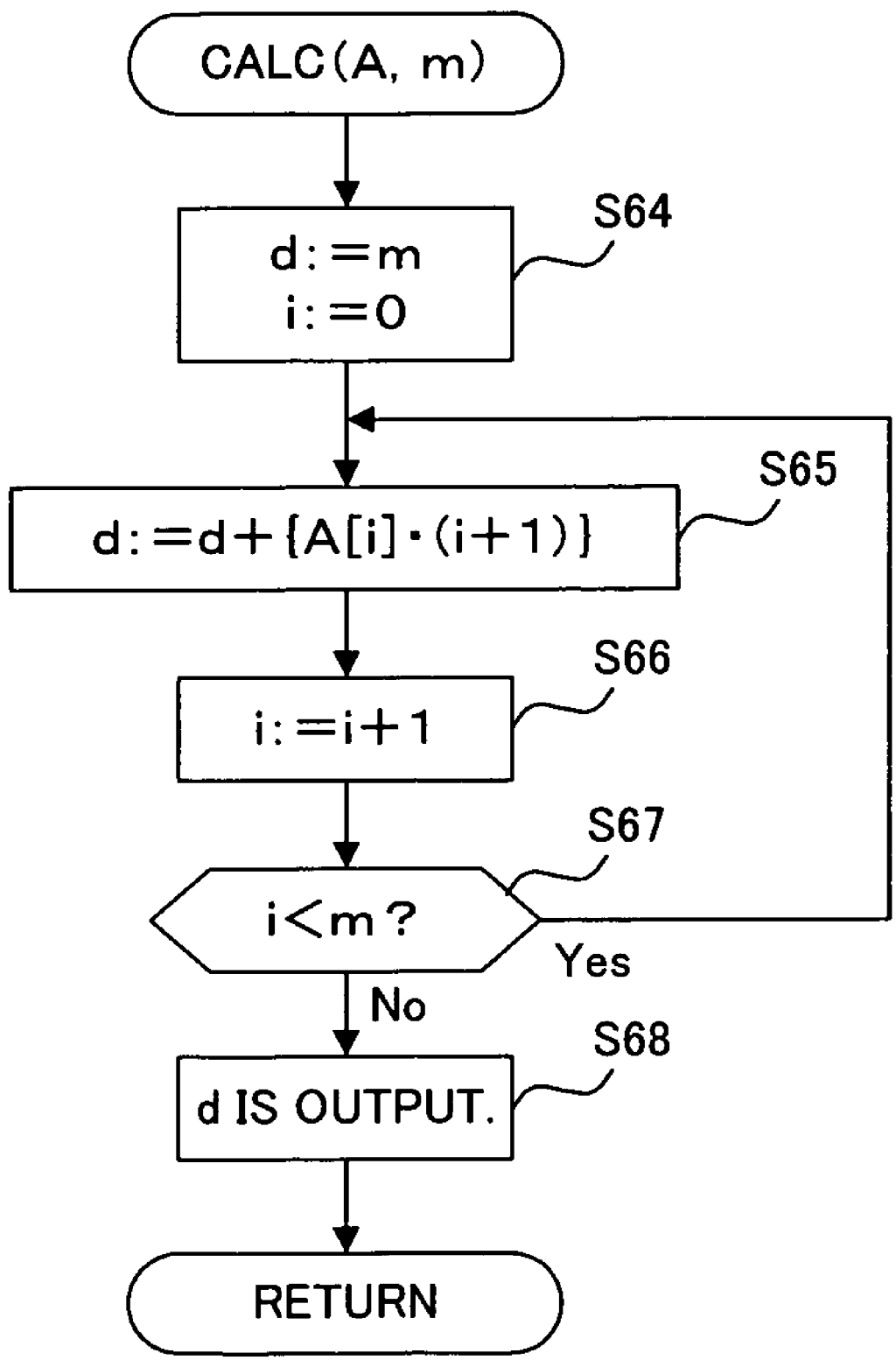
FIG. 23 is a flowchart illustrating the processing in step S60 in FIG. 22 in detail.

With reference to FIG. 22, the track data conversion value d calculation processing in step S44 will be described in detail.

In step S50, all the elements in a sequence variable A [0, 1, 2, . . . maximum number of elements−1] for recording the order of the recognition areas 49 passed by the input coordinate set are initialized to 0. A variable m indicating the element number is also initialized to 0, and the track data conversion value d as the return value is initialized to 0.

In step S51, it is determined whether or not there is a touch input. When there is a touch input, the processing advances to step S52; whereas when there is no touch input, the processing advances to step S59.

In step S52, an identification number p of each recognition area 49 passed by the input coordinate set is obtained. In the case where no input coordinate set is included in any of the recognition areas 49 in FIG. 12, p=$\phi$.

In step S53, it is determined whether or not the variable m is larger than 0. When the variable m is larger than 0, the processing advances to step S54; whereas when the variable m is 0, the processing advances to step S55.

In step S54, it is determined whether or not the identification number p detected in step S52 is different from the value of A[m−1] stored immediately before. When the identification number p is different from the value of A[m−1], the processing advances to step S55; whereas when the identification number p is equal to the value of A[m−1], the processing returns to step S51.

In step S55, it is determined whether or not the identification number p detected in step S52 is different from $\phi$. When the identification number p is different from $\phi$, the processing advances to step S56; whereas when the identification number p is $\phi$, the processing returns to step S51.

In step S56, the identification number p detected in step S52 is stored in A[m].

In step S57, "1" is added to the variable m.

In step S58, it is determined whether or not the variable m is smaller than the maximum number of elements of the sequence variable A. When the variable m is smaller than the maximum number of elements of the sequence variable A, the processing returns to step S51; whereas when the variable m is equal to the maximum number of elements of the sequence variable A (i.e., when the number of identification numbers p corresponding to the maximum number of elements have already been detected), the processing advances to step S60.

In step S59, it is determined whether or not the variable m is larger than 0. When the variable m is larger than 0 (i.e., when it was found there is no touch input anymore after the identification number p was detected at least once), the processing advances to step S60; whereas when the variable m is 0 (i.e., when it was found there is no touch input anymore before the identification number p was detected), the processing advances to step S61.

In step S60, the track data conversion value d is calculated based on the sequence variable A and the variable m. Hereinafter, with reference to the flowchart of FIG. 23, the calculation processing in step S60 will be described in detail.

In step S64, the value of the variable m is substituted into the track data conversion value d, and a variable i is initialized to 0.

In step S65, the track data conversion value d is updated. The track data conversion value d is updated based on A[i] and the variable i. In this example, the track data conversion value d is updated by adding A[i]●(i+1) to the value of d held at the current time. By this update, for example, the value of d obtained when the slide operation along the cut-out portion in FIG. 3 is directed from S to G is different from the value of d obtained when the slide operation along the cut-out portion in FIG. 3 is directed from G to S. Therefore, in which direction the slide operation was performed can be determined based on the value of d. In this example, the update is performed by adding A[i]●(i+1) to the value of d held at the current time. The present invention is not limited to this. The track data conversion value d may be updated in any other calculation technique.

In step S66, "1" is added to the variable i.

In step S67, it is determined whether or not the variable i is smaller than the variable m. When the variable i is smaller than the variable m, the processing returns to step S65; whereas when the variable i is equal to the variable m, the processing advances to step S68.

In step S68, the value of d held at the current time is stored in a predetermined area of the RAM 24, and the track data conversion value d calculation processing is terminated. The processing advances to step S61 in FIG. 22.

In step S61 in FIG. 22, the value of d held at the current time is stored in a predetermined area of the RAM 24, and the processing advances to step S45 in FIG. 21.

As a result of such processing, the track data conversion value v corresponding to the input operation by the player is calculated. The track data conversion value v obtained in this manner varies in accordance with the tracing direction and tracing order of the plurality of apertures by the player. Therefore, using the track data conversion value v, it can be determined in which order and in which direction the player traced the plurality of apertures. Thus, an event corresponding to the determination result can be generated.

(Third Modification)

Next, a third modification of the embodiment will be described. In the third modification, it is determined whether or not the player performed a slide operation along an aperture in a predetermined manner, in consideration of the speed of the slide operation as well as the above-mentioned factors. In this modification, referring to, for example, the card 40 shown in FIG. 11, it is made possible to, for example, generate a predetermined event only when the player traces the part of the cut-out portion 45 provided with the low speed indication mark 47 slowly and traces the other part of the cut-out portion 45 at a regular speed.

Hereinafter, the processing in the third modification will be described. The processing other than the track data conversion value d calculation processing (step S44 in FIG. 21) is identical with that of the second modification and thus will be omitted.

Figure 24:
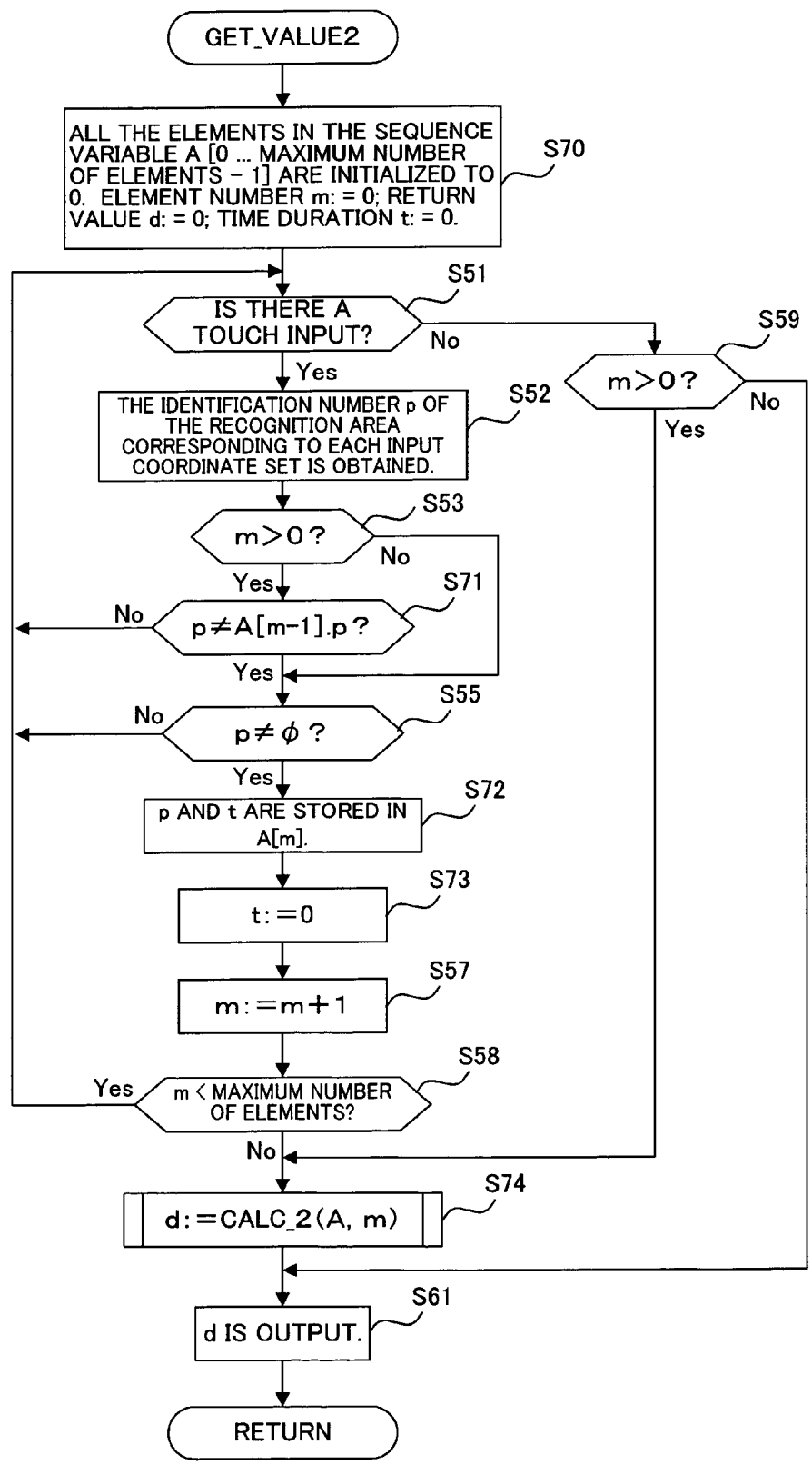
FIG. 24 is a flowchart illustrating a flow of obtaining a track data conversion value d in a third modification.

FIG. 24 is a flowchart illustrating a flow of the track data conversion value d calculation processing in the third modification. Regarding FIG. 24, the same procedures as those of FIG. 22 bear the same step numbers and will not be described.

In step S70, all the elements in a sequence variable A [0, 1, 2, . . . maximum number of elements−1], for recording (i) the order of the recognition areas 49 passed by the input coordinate set and (ii) the time interval at which the input coordinate set passes the recognition areas 49 (i.e., the time duration from the time when the input coordinate set passes one recognition area 49 until the input coordinate set passes the next recognition area 49), are initialized to 0. A variable m indicating the element number is also initialized to 0, and the track data conversion value d as the return value is initialized to 0. A variable t indicating the time duration from the time when the slide operation enters the immediately prior recognition area 49 is initialized to 0. Each element of the sequence variable A includes the identification number p of the corresponding recognition area 49 passed by the input coordinate set and the time duration t required by the input coordinate set to be transferred to the corresponding recognition area 49 from the immediately prior recognition area 49.

In step S71, it is determined whether or not the identification number p detected in step S52 is different from the value of A[m−1].p stored immediately before (the value of p stored in the m'th element of the sequence variable A). When the identification number p is different from the value of A[m−1].p, the processing advances to step S55; whereas when the identification number p is equal to the value of A[m−1].p, the processing returns to step S51.

In step S72, the identification number p detected in step S52 and the time duration t at the current time are stored in A[m].

In step S73, the time duration t is reset to 0.

Figure 25:
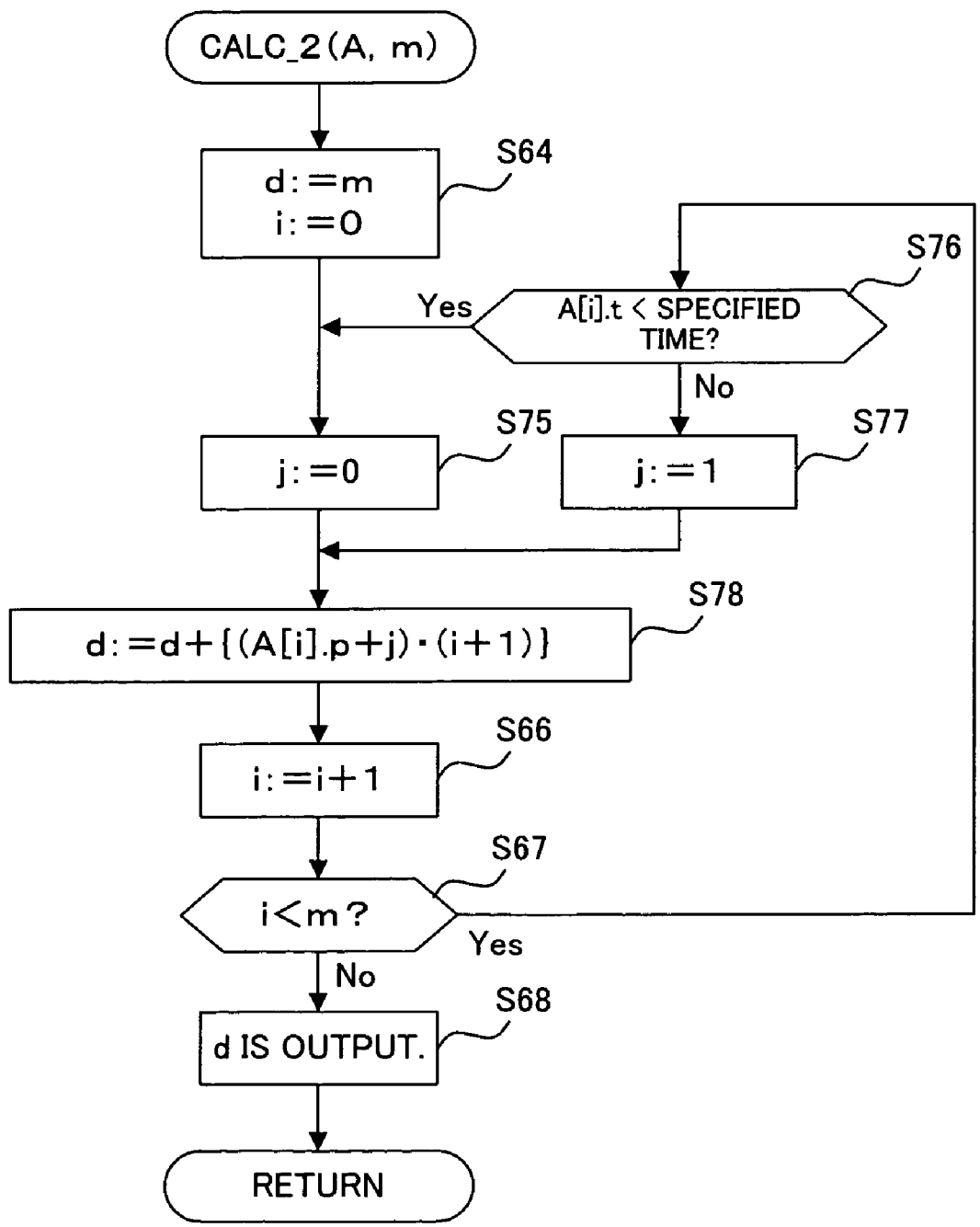
FIG. 25 is a flowchart illustrating the processing in step S74 in FIG. 24 in detail.

In step S74, the track data conversion value d is calculated based on the sequence variable A and the variable m. Hereinafter, with reference to the flowchart of FIG. 25, the calculation processing in step S74 will be described in detail. Regarding FIG. 25, the same procedures as those of FIG. 23 bear the same step numbers and will not be described.

After step S64, in step S75, "0" is substituted into a variable j.

When it is determined in step S67 that the variable i is smaller than the variable m, the processing advances to step S76. In step S76, it is determined whether or not the value of A[i].t (i.e., the value of t stored in the (i+1)th element of the sequence variable A) is smaller than a predetermined specified time. When the value of A[i].t is smaller than the predetermined specified time, the processing returns to step S75; whereas when the value of A[i].t is not smaller than the predetermined specified time, the processing advances to step S77.

In step S77, "1" is substituted into the variable j.

In step S78, the track data conversion value d is updated. The track data conversion value d is updated based on A[i], the variable i and the variable j. In this example, the track data conversion value d is updated by adding (A[i].p+j)●(i+1) to the value of d held at the current time. By this update, for example, the value of d varies in accordance with whether or not the time duration, from the time when the input coordinate set enters one recognition area 49 until the input coordinate set enters the next recognition area 49, is smaller than the predetermined specified time. Therefore, referring to, for example, the card 40 shown in FIG. 11, it can be determined, using the value of d, whether or not the player traced the part of the cut-out portion 45 provided with the low speed indication mark 47 slowly and traced the other part of the cut-out portion 45 at a regular speed. In this example, the update is performed by adding (A[i].p+j)●(i+1) to the value of d held at the current time. The present invention is not limited to this. The track data conversion value d may be updated in any other calculation technique.

As a result of such processing, the track data conversion value v corresponding to the input operation by the player is calculated. The track data conversion value v obtained in this manner varies in accordance with the tracing direction, tracing order and tracing speed of the plurality of apertures by the player. Therefore, using the track data conversion value v, it can be determined in which order and in which direction the player traced the plurality of apertures, and at which speed the player traced each part of the plurality of apertures. Thus, an event corresponding to the determination result can be generated.

(Fourth Modification)

Next, a fourth modification of the embodiment will be described. In the fourth modification, it is determined whether or not the player performed a slide operation along an aperture in a predetermined manner, in consideration of the speed of the slide operation and also whether or not there was a microphone input. In this modification, referring to, for example, the card 40 shown in FIG. 11, it is made possible to, for example, generate a predetermined even only when the player traces the part of the cut-out portion 44 provided with the microphone input indication mark 46 while uttering a voice to a microphone (not shown) provided in the game apparatus 10 and traces the other part of the cut-out portion 44 without uttering a voice.

Hereinafter, the processing in the fourth modification will be described. The processing other than the track data conversion value d calculation processing (step S44 in FIG. 21) is identical with that of the second modification and thus will be omitted.

Figure 26:
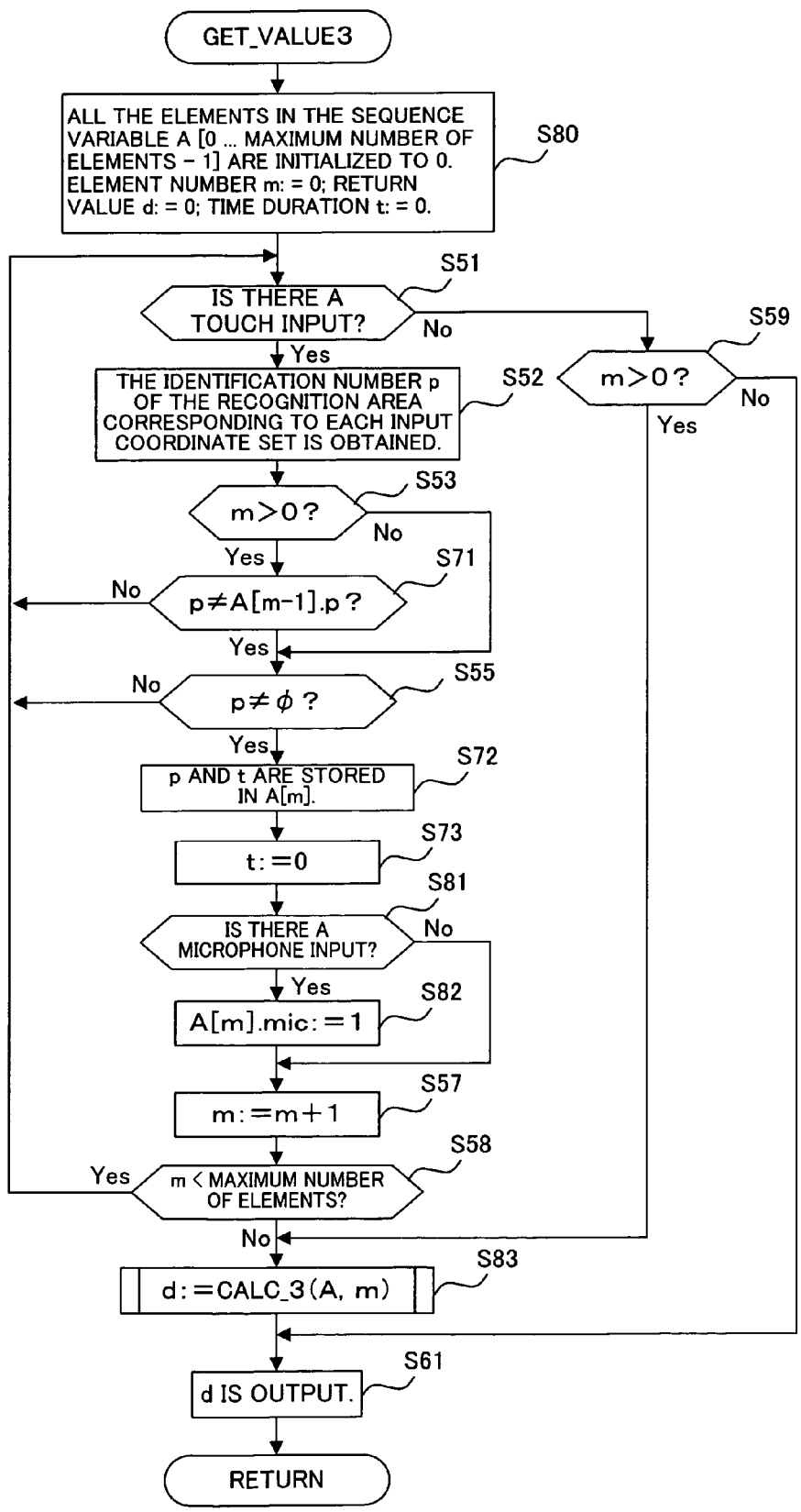
FIG. 26 is a flowchart illustrating a flow of obtaining a track data conversion value d in a fourth modification.

FIG. 26 is a flowchart illustrating a flow of the track data conversion value d calculation processing in the fourth modification. Regarding FIG. 26, the same procedures as those of FIG. 24 bear the same step numbers and will not be described.

In step S80, all the elements in a sequence variable A [0, 1, 2, . . . maximum number of elements−1], for recording (i) the order of the recognition areas 49 passed by the input coordinate set, (ii) the time interval at which the input coordinate set passes the recognition areas 49, and (iii) whether or not there is a microphone input in correspondence with the recognition areas 49 passed by the input coordinate set, are initialized to 0. A variable m indicating the element number is also initialized to 0, and the track data conversion value d as the return value is initialized to 0. A variable t indicating the time duration from the time when the slide operation enters the immediately prior recognition area 49 is initialized to 0. Each element of the sequence variable A includes the identification number p of the corresponding recognition area 49 passed by the input coordinate set, the time duration t required by the input coordinate set to be transferred to the corresponding recognition area 49 from the immediately prior recognition area 49, and a flag mic indicating whether or not there is a microphone input during the transfer.

In step S81, it is determined whether or not there was a microphone input from the time when the identification number p or the like was stored in A[m−1] until the identification number p or the like is stored in A[m] in step S72. When there was a microphone input, the processing advances to step S82; whereas when there was no microphone input, the processing advances to step S57. A microphone input can be detected by using, for example, interrupt processing.

In step S82, "1" is substituted into A[m] .mic (i.e., the flag mic stored in the (m+1)th element of the sequence variable A).

Figure 27:
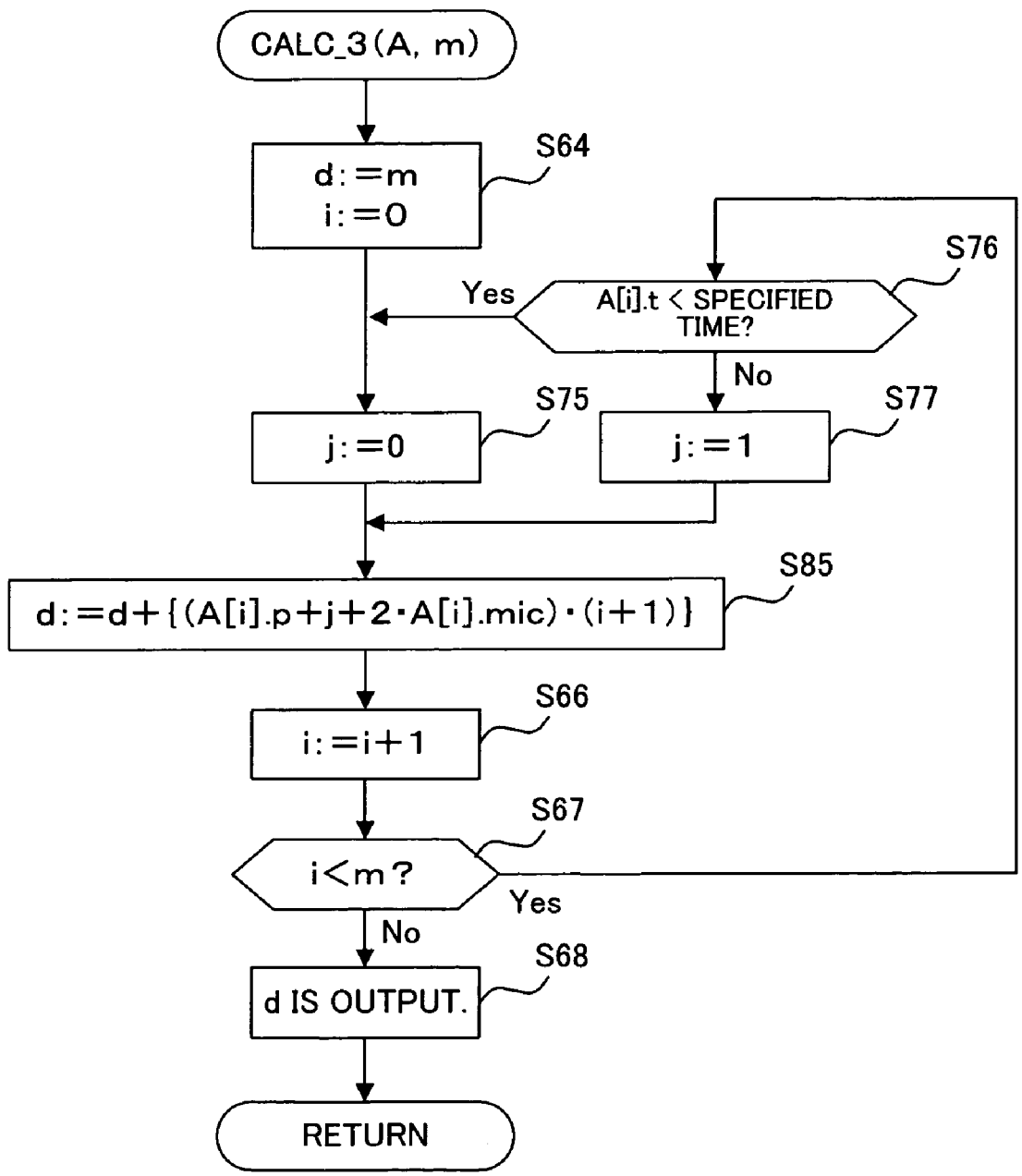
FIG. 27 is a flowchart illustrating the processing in step S83 in FIG. 26 in detail.

In step S83, the track data conversion value d is calculated based on the sequence variable A and the variable m. Hereinafter, with reference to the flowchart of FIG. 27, the calculation processing in step S83 will be described in detail. Regarding FIG. 27, the same procedures as those of FIG. 25 bear the same step numbers and will not be described.

In step S85, the track data conversion value d is updated. The track data conversion value d is updated based on A[i], the variable i and the variable j. In this example, the track data conversion value d is updated by adding (A[i].p+j+2●A[i] .mic)●(i+1) to the value of d held at the current time. By this update, for example, the value of d varies in accordance with whether or not there is a microphone input from the time when the input coordinate set enters one recognition area 49 until the input coordinate set enters the next recognition area 49. Therefore, referring to, for example, the card 40 shown in FIG. 11, it can be determined, using the value of d, whether or not the player traced the part of the cut-out portion 44 provided with the microphone input indication mark 46 while uttering a voice and traced the other part of the cut-out portion 44 without uttering a voice. In this example, the update is performed by adding (A[i].p +j+2●A[i].mic)●(i+1) to the value of d held at the current time. The present invention is not limited to this. The track data conversion value d may be updated in any other calculation technique.

As a result of such processing, the track data conversion value v corresponding to the input operation by the player is calculated. The track data conversion value v obtained in this manner varies in accordance with the tracing direction, tracing order, and tracing speed of the plurality of apertures by the player, and presence/absence of a microphone input. Therefore, using the track data conversion value v, it can be determined in which order and in which direction the player traced the plurality of apertures, at which speed the player traced each part of the plurality of apertures, and whether or not the player traced a specific part of the apertures while uttering a voice. Thus, an event corresponding to the determination result can be generated.

(Fifth Modification)

Next, a fifth modification of the embodiment will be described. In the fifth modification, it is determined whether or not the player performed a slide operation along an aperture in a predetermined manner, in consideration of which of the plurality of color change keys provided in the game apparatus 10 was pressed. In this modification, referring to, for example, the card 40 shown in FIG. 3, it is made possible to, for example, generate a predetermined event only when the player traces the profile of the aperture 41 after pressing a predetermined color change key among the color change keys for changing the color of the track displayed on the screen of the second LCD 12. The color change keys are, for example, a color change key for changing the color to red (e.g., the A button 14d), a color change key for changing the color to blue (e.g., the B button 14e), a color change key for changing the color to yellow (e.g., the X button 14f), and a color change key for changing the color to green (e.g., the Y button 14g).

Figure 28:
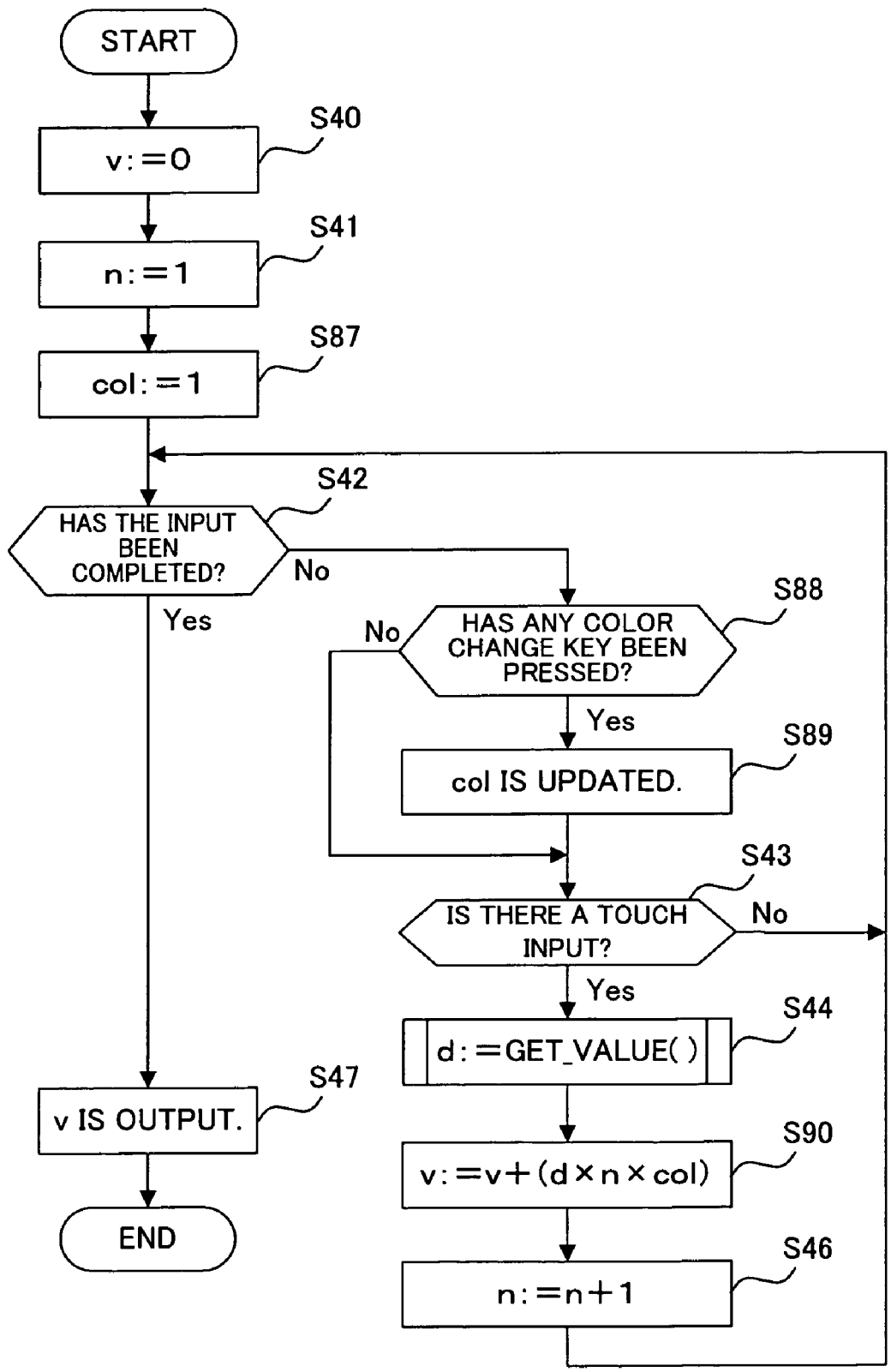
FIG. 28 is a flowchart illustrating a flow of processing executed by the CPU core 21 in a fifth modification.

Hereinafter, the processing in the fifth modification will be described with reference to the flowchart of FIG. 28. Regarding FIG. 28, the same procedures as those of FIG. 21 bear the same step numbers and will not be described.

In step S87, color information col indicating the color selected by the player is initialized to 1.

In step S88, it is determined whether or not which one of the color change keys has been pressed by the player. When one of the color change keys has been pressed, the processing advances to step S89; whereas when no color change key has been pressed, the processing advances to step S43.

In step S89, the color information col is changed into a value corresponding to the color change key pressed by the player. The value corresponding to each color change key is pre-defined. For example, the value corresponding to the color change key for changing the color of the track to red is 1; the value corresponding to the color change key for changing the color to blue is 2; the value corresponding to the color change key for changing the color to yellow is 3; and the value corresponding to the color change key for changing the color to green is 4.

In step S90, the track data conversion value v is updated based on the variable n, the track data conversion valued calculated in step S44, and the color information col. In this example, the track data conversion value v is updated by adding d×n×col to the value of v held at the current time. By this update, for example, the value of v varies in accordance with the color change key which is pressed before the slide operation along each aperture. Therefore, it is made possible to, for example, generate an event only when each aperture is drawn with a predetermined color. In this example, the update is performed by adding d×n×col to the value of v held at the current time. The present invention is not limited to this. The track data conversion value v may be updated in any other calculation technique.

(Sixth Modification)

In the fifth modification, the color of the track is changed by the player operating the color change keys provided in the game apparatus 10. The color of the track may be changed by the player putting the stick 16 into contact with the touch panel 15 through one of the color change apertures 48r, 48b, 48y and 48g formed in the card 40 as shown in FIG. 11, instead of using the color change keys. For example, when the aperture is traced after the stick 16 contacts the touch panel 15 through the color change aperture 48r, the track may be displayed in red. When the aperture is traced after the stick 16 contacts the touch panel 15 through the color change aperture 48b, the track may be displayed in blue. When the aperture is traced after the stick 16 contacts the touch panel 15 through the color change aperture 48y, the track may be displayed in yellow. When the aperture is traced after the stick 16 contacts the touch panel 15 through the color change aperture 48g, the track may be displayed in green.

Figure 29:
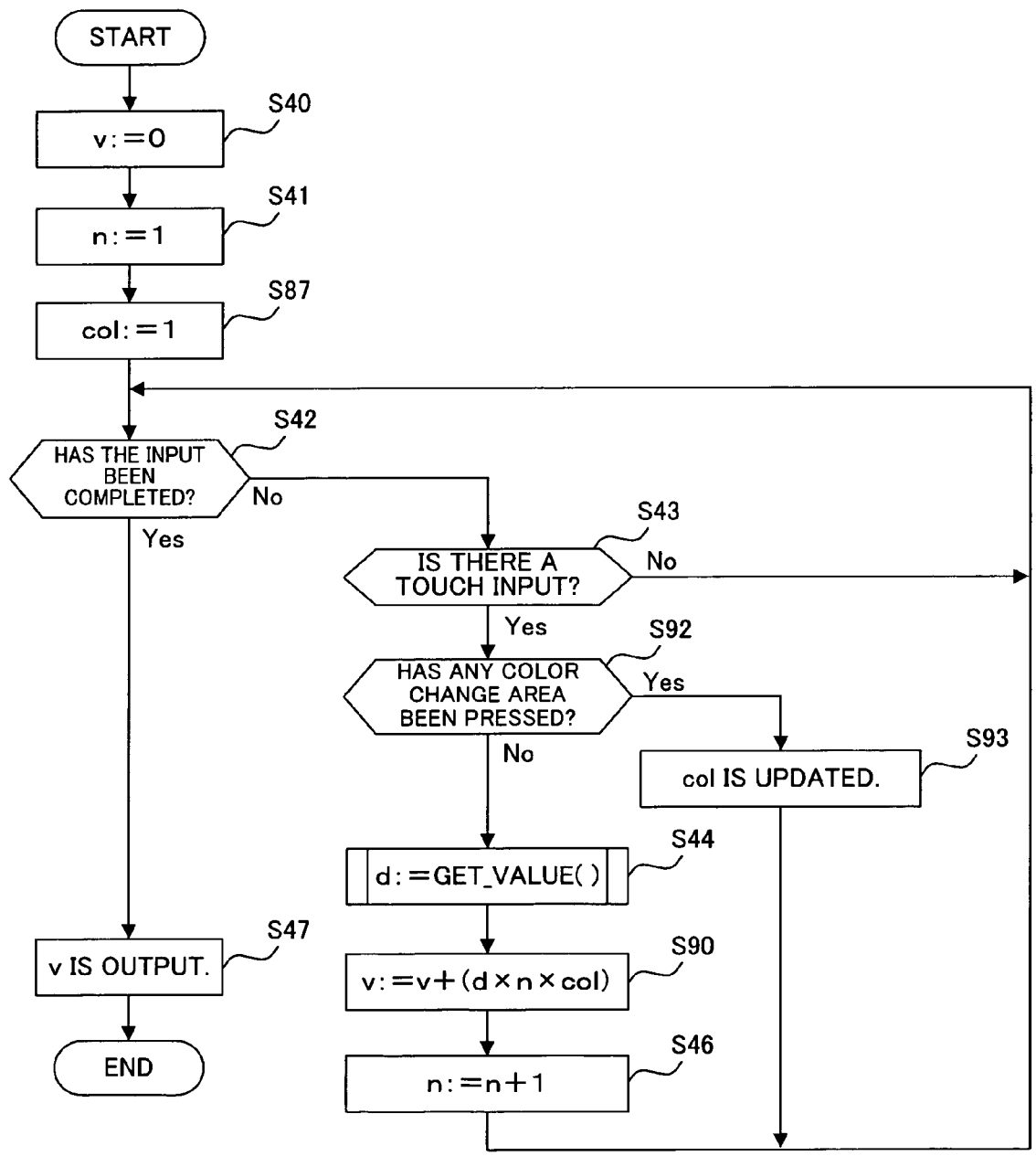
FIG. 29 is a flowchart illustrating a flow of processing executed by the CPU core 21 in a sixth modification.

Hereinafter, the processing in the sixth modification will be described with reference to the flowchart of FIG. 29. Regarding FIG. 29, the same procedures as those of FIG. 21 bear the same step numbers and will not be described.

In step S92, it is determined whether or not an area of the touch panel 15 corresponding to one of the color change aperture s has been pressed based on the input coordinate set. When an area of the touch panel 15 corresponding to one of the color change apertures has been pressed, the processing advances to step S93; whereas when some other area of the touch panel 15 has been pressed, the processing advances to step S44.

In step S93, the color information col is changed into a value corresponding to the area of the touch panel 15 corresponding to the color change aperture through which the stick 16 contacted the touch panel 16. The value corresponding to each color change aperture is pre-defined. For example, the value corresponding to the color change aperture 48r is 1; the value corresponding to the color change aperture 48b is 2; the value corresponding to the color change aperture 48y is 3; and the value corresponding to the color change aperture 48g is 4.

By the above-described processing, the sixth modification provides substantially the same effect as that of the fifth modification.

(Seventh Modification)

In the fifth modification, the color of the track is changed by the player operating the color change keys provided in the game apparatus 10. In the sixth modification, the color of the track is changed by the player putting the stick 16 into contact with the touch panel 15 through one of the color change apertures 48r, 48b, 48y and 48g formed in the card 40. Alternatively, the color of the track may be changed by keeping the stick 16 in contact with the start point (i.e., the first position at which the stick 16 contacts the touch panel 15) before performing a slide operation along an aperture. For example, when the slide operation is started within 3 seconds after the stick 16 contacts the touch panel 15, the track may be displayed in red. When the slide operation is started 3 through 6 seconds after the stick 16 contacts the touch panel 15, the track may be displayed in blue. When the slide operation is started 6 through 9 seconds after the stick 16 contacts the touch panel 15, the track may be displayed in yellow. When the slide operation is started 9through 12 seconds after the stick 16 contacts the touch panel 15, the track may be displayed in green.

Figure 30:
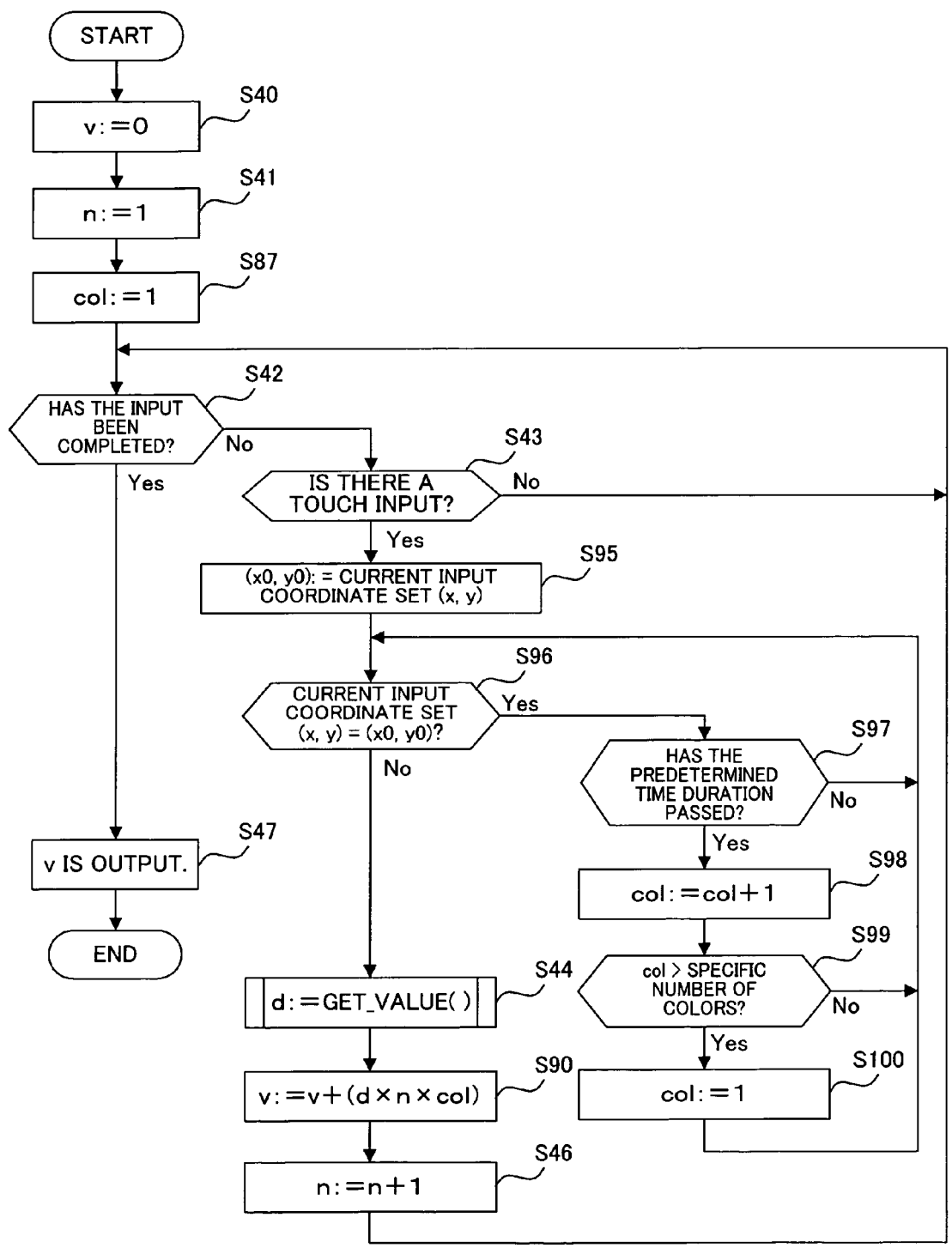
FIG. 30 is a flowchart illustrating a flow of processing executed by the CPU core 21 in a seventh modification.

Hereinafter, the processing in the seventh modification will be described with reference to the flowchart of FIG. 30. Regarding FIG. 30, the same procedures as those of FIG. 29 bear the same step numbers and will not be described.

In step S95, the current input coordinate set (x, y) is stored as the start coordinate set (x0, y0).

In step S96, it is determined whether or not the current input coordinate set (x, y) is the same as the start coordinate set (x0, y0) stored in step S95. When the two coordinate sets are the same (i.e., when the input coordinate set has not been transferred from the start point), the processing advances to step S97; whereas when the two coordinate sets are different (i.e., when the input coordinate set has been transferred from the start point), the processing advances to step S44.

In step S97, it is determined whether or not a predetermined time duration (e.g., 3 seconds) has passed after a touch input was detected or after the color information was changed the immediately previous time. When the predetermined time duration has passed, the processing advances to step S98; whereas when the predetermined time duration has not passed yet, processing returns to step S96.

In step S98, "1" is added to the color information col.

In step S99, it is determined whether or not the value of the color information col has exceeded a specific number of colors (four colors of red, blue, yellow and green) as a result of the addition of "1" in step S98. When the value has exceeded the specific number of colors, the processing advances to step S100; whereas when the value has not exceeded the specific number of colors yet, the processing returns to step S96.

In step S100, the color information col is reset to 1, and the processing returns to step S96.

By the above-described processing, the seventh modification provides substantially the same effect as that of the fifth and sixth modifications. The seventh modification does not require the color change keys or color change apertures and thus is especially suitable for a small game apparatus.

In the fifth through seventh modifications, the color of the track is changed and such information is reflected on the track data conversion value d or the track data conversion value v. The information to be reflected on the track data conversion value d or the track data conversion value v (additional information) may be any other information instead of the color of the track. For example, the color of the background of the first LCD 11 or the second LCD 12 may be changed.

While the example embodiment has been described in detail, the foregoing description is in all aspects illustrative and not restrictive. It is understood that numerous other modifications and variations can be devised without departing from the scope of the example embodiment.

What is claimed is:

1. A game system including a game apparatus having a touch panel, and a card detachably mountable at a predetermined position of the touch panel;

wherein:

the card has at least one aperture formed of a hole or a cut-out portion having a predetermined shape; and the game apparatus comprises:
  determination information storage locations for storing determination information for determining whether or not an input operation on the touch panel has been performed along the aperture of the card in the state where the card is placed at the predetermined position of the touch panel; and at least one computer processor configured to:
  detect an input track based on a signal from the touch panel;
  determine whether or not the input operation on the touch panel has been performed along the aperture of the card based on the detected input track and the determination information stored by the determination information storage locations; and
  generate an event which changes the progress of a game in a virtual game world displayed on a display of the game apparatus when the determined input operation on the touch panel has been performed along the aperture, wherein said change of the progress of the game is related to player characters and objects in the virtual game world.

2. A game system according to claim 1, wherein:
the determination information storage locations store, as the determination information, a comparative track corresponding to an input track obtained when an input operation is performed along the aperture of the card in the state where the card is placed on the touch panel; and the computer processor is configured to
calculate a similarity degree between the detected input track and the comparative track, and determine whether or not the input operation on the touch panel has been performed along the aperture of the card based on the similarity degree.

3. A game system according to claim 2, wherein:
the determination information storage locations store, as the determination information, a plurality of pieces of coordinate set data forming the comparative track to be checked against the input track; and the computer processor is configured to
calculate at least one of (i) a difference between an angle of each of line segments of the input track and an angle of each of corresponding line segments of the comparative track, and (ii) a difference between a position of each of apexes of the input track and a position of each of corresponding apexes of the comparative track, based on the plurality of pieces of coordinate data stored by the determination information storage locations and coordinate data of the detected input track, and calculate the similarity degree based on the calculation result.

4. A game system according to claim 1, wherein:
the game apparatus further comprises recognition area information storage locations for storing a plurality of recognition areas virtually set on an operation plane of the touch panel and recognition area information which associates unique recognition information to each of the plurality of recognition areas; the computer processor is configured to
sequentially detect input coordinate sets based on a signal from the touch panel and sequentially determine which recognition area includes each input coordinate set referring to the recognition area information; and
determine whether or not the input operation on the touch panel has been performed along the aperture based on an identification number of each of the recognition areas determined by the detected input track.

5. A game system according to claim 4, wherein the computer processor is configured to perform a predetermined calculation using the identification number of each of the recognition areas determined by the detected input track, and determine whether or not the input operation on the touch panel has been performed along the aperture based on the calculation result.

6. A game system according to claim 4, wherein
the computer processor is configured to perform a predetermined calculation based on the identification number of each of the recognition areas determined in the detected input track and an order by which the recognition areas were determined in the detected input track, and determine whether or not the input operation on the touch panel has been performed along the aperture based on the calculation result.

7. A game system according to claim 4, wherein:
the computer processor is configured to, when each recognition area is detected, detect a time duration from the time when the immediately prior recognition area was detected; and
perform a predetermined calculation based on the identification number of each of the detected recognition areas and the time durations corresponding to the detected recognition areas, and determine whether or not the input operation on the touch panel has been performed along the aperture based on the calculation result.

8. A game system according to claim 4, wherein:
the game apparatus further comprises a microphone, and a voice input detector for, when each recognition area is determined, detect whether or not a voice input from the microphone has been made; and
the computer processor is configured to perform a predetermined calculation based on the identification number of each of the determined recognition areas and the determination result made by the voice input detector in correspondence with each of the recognition areas, and determine whether or not the input operation on the touch panel has been performed along the aperture based on the calculation result.

9. A game system according to claim 4, wherein:
the computer processor is configured to Select one of a plurality of pieces of prepared additional information in accordance with an instruction by a player; and
perform a predetermined calculation based on the identification number of each of the determined recognition areas and the selected additional information when each recognition area was determined, and determine whether or not the input operation on the touch panel has been performed along the aperture based on the calculation result.

10. A game system according to claim 1, wherein the card has a mark indicating a sliding direction of the input operation along the aperture of the card.

11. A game apparatus comprising:
a touch panel for allowing a card having at least one aperture formed of a hole or a cut-out portion having a predetermined shape to be placed thereon;
determination information storage locations for storing determination information for determining whether or not an input operation on the touch panel has been performed along the aperture of the card in the state where the card is placed at the predetermined position of the touch panel; and at least one computer processor configured to:
detect an input track based on a signal from the touch panel;

determine whether or not the input operation on the touch panel has been performed along the aperture of the card based on the detected input track and the determination information stored by the determination information storage locations; and generate an event which changes the progress of a game in a virtual game world displayed on a display of the game apparatus when the determined input operation on the touch panel has been performed along the aperture, wherein said change of the progress of the game is related to player characters and objects in the virtual game world.

12. A non-transitory computer-readable physical storage medium having tangibly recorded thereon a game program for a game system including a game apparatus having a touch panel, and a card which is detachably mountable at a predetermined position of the touch panel and has at least one aperture formed of a hole or a cut-out portion having a predetermined shape, the game program causing the game apparatus to perform:

storing determination information for determining whether or not an input operation on the touch panel has been performed along the aperture of the card in the state where the card is placed at the predetermined position of the touch panel;

detecting an input track based on a signal from the touch panel;

determining whether or not the input operation on the touch panel has been performed along the aperture of the card based on the detected input track and the determination information stored by the determination information storage; and generating an event which changes the progress of a game in a virtual game world displayed on a display of the game apparatus when the input operation determination determines that the input operation on the touch panel has been performed along the aperture, wherein said change of the progress of the game is related to player characters and objects in the virtual game world.

13. A method for generating an event which influences the progress of a game for a game system including a game apparatus having a touch panel, and a card which is detachably mountable at a predetermined position of the touch panel and has at least one aperture formed of a hole or a cut-out portion having a predetermined shape, the method comprising:

storing determination information for determining whether or not an input operation on the touch panel has been performed along the aperture of the card in the state where the card is placed at the predetermined position of the touch panel;

detecting an input track based on a signal from the touch panel;

determining whether or not the input operation on the touch panel has been performed along the aperture of the card based on the detected input track and the determination information stored by the determination information storage; and generating an event which changes the progress of a game in a virtual game world displayed on a display of the game apparatus when the input operation determination determines that the input operation on the touch panel has been performed along the aperture, wherein said change of the progress of the game is related to player characters and objects in the virtual game world.

* * * * *